United States Patent
Du

(10) Patent No.: US 10,126,531 B2
(45) Date of Patent: Nov. 13, 2018

(54) MOTORIZED INTERCHANGEABLE LENS SYSTEM

(71) Applicant: Xing Du, Newport Beach, CA (US)

(72) Inventor: Xing Du, Newport Beach, CA (US)

( * ) Notice: Subject to any disclaimer, the term of this patent is extended or adjusted under 35 U.S.C. 154(b) by 216 days.

(21) Appl. No.: 14/673,580

(22) Filed: Mar. 30, 2015

(65) Prior Publication Data

US 2016/0223783 A1 Aug. 4, 2016

Related U.S. Application Data

(63) Continuation-in-part of application No. 14/612,253, filed on Feb. 2, 2015, now abandoned.

(51) Int. Cl.
| | |
|---|---|
| *G02B 7/16* | (2006.01) |
| *G02B 13/00* | (2006.01) |
| *H04N 5/232* | (2006.01) |
| *H04N 5/225* | (2006.01) |
| *G02B 7/14* | (2006.01) |

(52) U.S. Cl.
CPC .............. *G02B 13/009* (2013.01); *G02B 7/14* (2013.01); *G02B 7/16* (2013.01); *H04N 5/2254* (2013.01); *H04N 5/2258* (2013.01); *H04N 5/23296* (2013.01)

(58) Field of Classification Search
CPC . G02B 7/14; G02B 7/16; G02B 7/027; G02B 7/006
USPC ..... 359/821, 196.1–226.3; 362/35, 232, 241, 362/269; 396/175
See application file for complete search history.

(56) References Cited

U.S. PATENT DOCUMENTS

| | | | |
|---|---|---|---|
| 5,113,332 A | * | 5/1992 | Richardson ........... F21S 10/007 362/282 |
| 5,128,808 A | | 7/1992 | Dosaka |
| 5,576,897 A | | 11/1996 | Kuo |
| 5,617,260 A | | 4/1997 | McNiven et al. |
| 5,638,222 A | | 6/1997 | Shigehara |
| 5,687,031 A | | 11/1997 | Ishihara |
| 5,818,637 A | | 10/1998 | Hoover et al. |

(Continued)

FOREIGN PATENT DOCUMENTS

| | | |
|---|---|---|
| CN | 103513394 A | 1/2014 |
| CN | 203535358 U | 4/2014 |

(Continued)

OTHER PUBLICATIONS

"U.S. Appl. No. 14/612,253, Non-Final Office Action dated Oct. 3, 2016", 17 pgs.

(Continued)

*Primary Examiner* — Ricky Mack
*Assistant Examiner* — Gary O'Neill
(74) *Attorney, Agent, or Firm* — Schwegman Lundberg & Woessner, P.A.

(57) ABSTRACT

The present invention generally relates to a motorized lens tray for a multi-focal length lens imaging system. In particular, a lens trays holds a variety of fixed focal length lenses, and a motorized mechanism moves the lens tray to align the desired lens with an imaging unit. This provides the flexibility to change focal lengths without the complexity, size, weight, and image quality degradation associated with a zoom lens. Certain embodiments of the invention are intended for use with digital cameras and cellular phones.

17 Claims, 14 Drawing Sheets

(56) References Cited

U.S. PATENT DOCUMENTS

| | | |
|---|---|---|
| 7,835,091 B2 | 11/2010 | Tseng et al. |
| 2002/0141023 A1* | 10/2002 | Yamada ............... G02B 26/106 |
| | | 359/198.1 |
| 2012/0121244 A1* | 5/2012 | Stavely ................. F21V 5/007 |
| | | 396/175 |
| 2013/0028591 A1 | 1/2013 | Hicks |
| 2016/0223781 A1 | 8/2016 | Du |

FOREIGN PATENT DOCUMENTS

| | | |
|---|---|---|
| CN | 203982057 U | 12/2014 |
| WO | WO-2013/094811 A1 | 6/2013 |

OTHER PUBLICATIONS

"U.S. Appl. No. 14/612,253, Preliminary Amendment filed Mar. 13, 2015", 6 pgs.
"U.S. Appl. No. 14/612,253, Preliminary Amendment filed Mar. 24, 2015", 69 pgs.
"International Application Serial No. PCT/CN2015/084913, International Search Report dated Nov. 11, 2015", (w/ English Translation), 11 pgs.
"International Application Serial No. PCT/CN2015/084913, Written Opinion dated Nov. 11, 2015", 5 pgs.

* cited by examiner

MOTORIZED INTERCHANGEABLE LENS SYSTEM

RELATED APPLICATIONS

This application is a continuation-in-part of and claims priority to U.S. patent application Ser. No. 14/612,253, entitled "Motorized Interchangeable Lens System" filed Feb. 2, 2015, the contents of which is herein incorporated by reference in its entirety.

FIELD OF INVENTION

The present invention generally relates to a motorized lens tray for a multi-focal length lens imaging system. In particular, a lens trays holds a variety of fixed focal length lenses, and a motorized mechanism moves the lens tray to align the desired lens with an imaging element. This provides the flexibility to change focal lengths without the complexity, size, weight, and image quality degradation associated with a zoom lens. Certain embodiments of the invention are intended for use with digital cameras, camcorders, and cellular phones.

BACKGROUND OF THE INVENTION

With the advent of digital cameras, people can better capture memories and communicate points of view. Current technology enables pictures to be easily and conveniently previewed, taken, and reviewed. Digital photography has made cameras compact, portable, and low-powered. However, certain trade-offs are often associated with the portability that miniaturization brings, somewhat undermining the benefits of a readily accessible form of image-capture.

Specifically, zoom lenses appear at first to be versatile and provide more interesting images than prime lenses. A prime lens has a fixed focal length, so a user must adjust his or her relative position to get a desired image. This can impede the capture of an image if there is not enough physical space to properly frame the desired image. In contrast, a user is able to transition from a wide-angle view to a telephoto view with a single zoom lens without the need to physically move and thus capture alternative views. However, at the expense of such flexibility, the image quality from a zoom lens is considerably poorer than that from a prime lens. Part of this loss of image quality can sometimes be attributed to constraints on the range of aperture sizes available in a zoom lens. Generally a narrower aperture is unsuitable for low light situations and the resulting photo may appear blurry. Poorer image quality is also due in part to more glass for light to travel through. Additional glass has the effect of altering the light, leading to some degradation of the light. In contrast, a prime lens preserves the integrity of an image by virtue of its simple design. A prime lens has one focal length and fewer moving parts than a zoom lens that yield an image of maximum sharpness.

Additionally, for a camera module to provide zoom lens capability, the internal construction of the lens is rather complicated. For example, zoom lenses generally have over hundreds of individual parts. Therefore, one poorly machined part may squander the financial investment in the zoom lens, whether at the manufacturing stage or the commercial stage. Also, zoom lenses tend to be bulky and heavy, making them infeasible where portability is paramount.

Prime, or fixed focal length, camera lenses typically provide higher quality images than zoom or variable focal length lenses. Prime lenses also tend to be more compact and light weight than zoom lenses. In many modern imaging devices, particularly mobile phones, compactness is of utmost importance, making zoom lenses somewhat impractical. Therefore, some flexibility regarding varying focal lengths is typically sacrificed in mobile devices. However, the current invention is aimed at providing the high quality of images resulting from the use of prime lenses along with the convenience of having multiple focal lengths of a zoom lens.

Therefore, there is a need in the arts for a camera feature that allows for the versatility of a zoom lens with the image reproducing capabilities, light weight, and compactness of a prime lens. These and other features and advantages of the present invention will be explained and will become obvious to one skilled in the art through the summary of the invention that follows.

SUMMARY OF THE INVENTION

Accordingly, embodiments of the present invention are directed to a motorized interchangeable lens system comprising the following:

According to an embodiment of the present invention, a powered interchangeable lens system comprises: a first planar lens tray comprising: an optical entrance where incoming light enters the first planar lens tray, an optical exit where outgoing light exits the first planar lens tray, a first optical channel arranged within the first planar lens tray between the optical entrance and the optical exit, wherein the first optical channel contains zero or more optical elements; an incoming reflector arranged to redirect incoming light toward the first optical channel; a first motor configured to move the first planar lens tray and align the optical exit into a desired position.

According to an embodiment of the present invention, the first planar lens tray is circular, and the first motor is configured to rotate the circular first planar lens tray.

According to an embodiment of the present invention, the powered interchangeable lens system further comprises: a hole through the geometric center of the circular first planar lens tray, creating an inside edge and an outside edge of the circular first planar lens tray; a second optical channel arranged inside the hole such that the second optical channel stays fixed when the first motor moves the first planar lens tray to align the optical exit into a desired position.

According to an embodiment of the present invention, the powered interchangeable lens system further comprises: a third optical channel positioned directly across the hole from the first optical channel such that the first optical channel, the second optical channel, and the third optical channel align when the optical exit is aligned in a desired position.

According to an embodiment of the present invention, the powered interchangeable lens system further comprises: a hole through the geometric center of the circular first planar lens tray, creating an inside edge and an outside edge of the circular first planar lens tray; wherein the optical entrance is placed at the inside edge of the circular first planar lens tray; and wherein the incoming reflector is arranged inside the hole such that incoming light is redirected into the optical entrance when the optical exit is aligned into a desired position.

According to an embodiment of the present invention, the powered interchangeable lens system further comprises: a hole through the geometric center of the circular first planar lens tray, creating an inside edge and an outside edge of the circular first planar lens tray; wherein the optical exit is placed at the inside edge of the circular first planar lens tray.

According to an embodiment of the present invention, the powered interchangeable lens system further comprises an imaging element arranged inside the hole such that outgoing light from the optical exit is directed toward the imaging element when the optical exit is aligned in a desired position.

According to an embodiment of the present invention, the powered interchangeable lens system further comprises an outgoing reflector arranged inside the hole such that outgoing light from the optical exit is redirected when the optical exit is aligned into a desired position.

According to an embodiment of the present invention, the powered interchangeable lens system further comprises two or more points of entry for light, wherein the points of entry are arranged at different distances from the geometric center of the circular first planar lens tray.

According to an embodiment of the present invention, the optical entrance is placed at the outer perimeter of the first planar lens tray; and the incoming reflector is arranged outside the outer perimeter of the first planar lens tray such that incoming light is redirected into the optical entrance when the optical exit is aligned into a desired position.

According to an embodiment of the present invention, the optical exit is placed on the outer perimeter edge of the planar lens tray.

According to an embodiment of the present invention, the powered interchangeable lens system further comprises: an imaging element placed outside the outer perimeter edge of the planar lens tray such that outgoing light exiting the optical exit strikes the imaging element when the optical exit is aligned in a desired position.

According to an embodiment of the present invention, the powered interchangeable lens system further comprises: an outgoing reflector; wherein the outgoing reflector is arranged outside the outer perimeter edge of the first planar lens tray such that outgoing light from the optical exit is redirected when the optical exit is aligned into a desired position.

According to an embodiment of the present invention, the incoming reflector is embedded in the first planar lens tray at the optical entrance.

According to an embodiment of the present invention, the powered interchangeable lens system further comprises: a second planar lens tray having one or more optical window openings creating holes through a plane of the lens tray, and at least one of the optical window openings configured to hold an optical element within the second planar lens tray, and a second motor configured to move the second planar lens tray and align one of the two or more optical window openings into a desired position.

According to an embodiment of the present invention, the powered interchangeable lens system further comprises: a second planar lens tray comprising: a second optical entrance where incoming light enters the second planar lens tray, a second optical exit where outgoing light exits the second planar lens tray, a second optical channel arranged within the second planar lens tray between the second optical entrance and the second optical exit, wherein the second optical channel contains one or more optical elements; an intermediate reflector arranged to redirect light exiting the first lens tray toward the second optical entrance of the second lens tray; a second motor configured to move the second planar lens tray and align the second optical exit into a desired position.

According to an embodiment of the present invention, the powered interchangeable lens system further comprises two or more imaging elements.

According to an embodiment of the present invention, the powered interchangeable lens system further comprises: a second optical channel, and a double reflector configured to redirect light from the first optical channel 180 degrees and into the second optical channel.

According to an embodiment of the present invention, the powered interchangeable lens system further comprises a second reflector configured to receive light parallel to the plane defined by the planar lens tray and redirect the light to be perpendicular to the plane defined by the planar lens tray.

According to an embodiment of the present invention, the optical channel passes through the geometric center of the planar lens tray.

According to an embodiment of the present invention, the powered interchangeable lens system further comprises: an optical window opening creating a hole through the first planar lens tray, and configured to hold an optical element within the first planar lens tray, and an outgoing reflector embedded in the lens tray at the optical exit such that the optical channel can share the same imaging element with the optical window opening.

DETAILED SPECIFICATION

Figure 1:
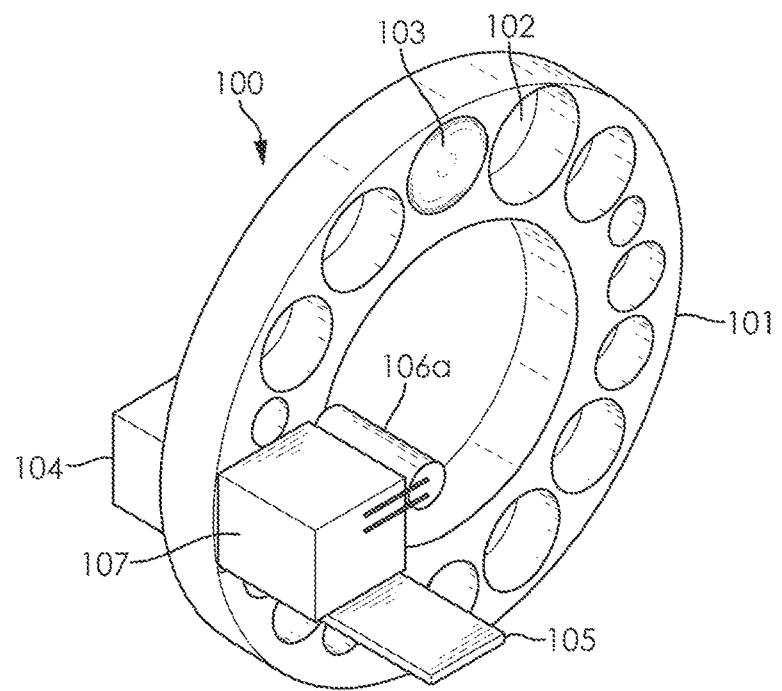
FIG. 1 is a perspective view of a motorized interchangeable lens system with an annular lens ring with an attached motor according to an embodiment of the present invention.

A motorized interchangeable lens system according to the current invention includes at least one lens tray, a motor, a motor controller, and may also include an imaging element. The motorized interchangeable lens system is designed to be incorporated into a mobile device, camera, camcorder, or other imaging device. The lens tray has formed within it, a plurality of optical window openings or holes. A optical window opening may hold an optical element such as a lens, lens stack, lens cover, or an optical filter, or an optical window opening may be empty. Empty optical window openings, or optical window openings not holding an optical element can be useful for a variety of reasons which will become apparent through this detailed specification. According to one embodiment, empty optical window openings allow a lens to be used in isolation without being combined with other lenses. Empty optical window openings may also allow for attachment of modular lenses to the outside of the imaging device. Other than any empty optical window openings, each optical window opening contains a lens or lens stack of a different focal length or a different optical filter. This allows for the flexibility of having a variety of different focal length lenses to be included in a compact device without requiring the complexity, size, and weight of a zoom lens. Since the size, thickness and diameter of each prime lens varies in order to provide the desired focal length, the diameters of each optical window opening also vary.

Lenses or lens stacks may comprise H-cut lenses, D-cut lenses, rectangular lenses, or lenses of any shape. Lenses of different shapes, such as H-cut lenses, can allow lens tray space to be used more efficiently and effectively. Lens stacks may optionally include photographic filters or other light refracting elements that produce color or geometric effects on the light. One of ordinary skill in the art would recognize that any lens, filter, or optical element may be used without departing from the spirit and scope of the present invention.

The present invention can be useful for creating a compact multi-focal length lens imaging system that is waterproof because the moving parts can be completely enclosed inside a waterproof case. No moving parts would need to be directly exposed to water, greatly simplifying the construction and reliability of a multi focal length lens imaging system that can be used under water.

The motorized interchangeable lens system may contain two or more lens trays. Each tray moves individually and independent of any other trays that are present. Therefore, lenses from each tray can be combined to achieve a greater variety of photographic or optical effects. For example, if Lens A of Lens Tray 1 is paired with Lens B of Lens Tray 2, the result may be a more powerful convergence or divergence of light. In another embodiment, Lens Tray 1 may contain lenses or a group of lenses while Lens Tray 2 may contain a variety of photographic filters. Lens A of Lens Tray 1 may pair with a infrared filter on Lens Tray 2 for night vision purposes. Accordingly, a variety of combinations may be achieved among optical elements to produce many photographic possibilities.

According to an embodiment of the present invention, the interchangeable lens system is combined with a software user interface which facilitates choosing the correct optical element combination for a given situation or according to user commands. These features will be described in greater detail beginning with FIG. 12.

Having described the basic structure and function of the a multi-focal length imaging system incorporating the current invention, various embodiments of the current invention will now be described in greater detail with reference to the drawings.

FIG. 1 shows a lens tray with various lens optical window openings attached to a motor and an imaging unit. According to one embodiment of the invention, the motorized interchangeable lens system 100 includes a lens tray 101, and an imaging unit 107. In this particular embodiment of the invention, the lens tray 101 is annular such that there is a hole in the center and the body of the lens tray contains multiple optical window openings 102 around the peripheral circumference. Each optical window opening holds a lens 103, a stack of lenses (shown in FIG. 6), a filter, or other optical element, and a motor 106a, mounted to the annular ring lens tray 101, rotates the ring about its central axis in order to position the appropriate lens 103 in line with the imaging unit 107. The interface board 105 receives power and control signals from the imaging device incorporating the motorized interchangeable lens system 100. The interface board 105 may be incorporated into the imaging unit 107, motor 106a, or lens tray 101. One of ordinary skill in the art would recognize that the interface board 105 may be placed anywhere without departing from the spirit and scope of the present invention.

Figure 6:
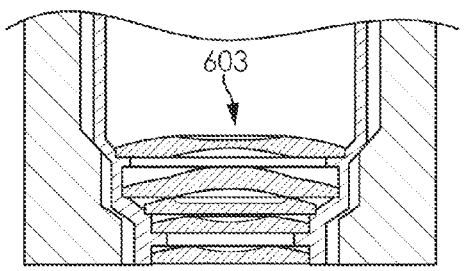
FIG. 6 is a cutaway side view of a stack of lenses that may be placed in optical window opening of a lens tray according to an embodiment of the present invention.

The lens tray 101 is thick enough to hold either a stack of lenses, as shown in FIG. 6 below, or single lenses 103 in each optical window opening at various positions within each optical window opening 102. For example, one lens 103 may be placed near the entrance side of the lens tray 101, where the lens cover assembly 104 is positioned. Another lens may be placed near the exit side of the lens tray 101 where the imaging unit 107 is positioned. The relative positions of the lenses 103 or lens stacks within the lens tray 101 optical window openings 102 are determined by the geometry of the lens and the configuration of the imaging unit 107. Lenses of different focal lengths may need to be placed closer to or farther from the imaging unit 107 in order to work correctly. One of ordinary skill in the art would recognize that the properties of the lens 103 or lens stack would determine the appropriate position within the lens tray 101 optical window opening 102.

The motor 106a may be arranged so that the drive shaft is perpendicular to the plane of the annular ring lens tray 10. A pinion gear on the drive shaft of the motor 106a engages with gear teeth on the inner edge of the annular ring lens tray 101. In an alternate embodiment, the motor 106a is arranged with the drive shaft parallel to the plane of the annular ring lens tray 101. In this case, a worm gear on the drive shaft of the motor 106a engages with teeth on the outer edge of the annular ring lens tray 101. The lens tray may also have gear teeth arranged on the front or rear face of the annular ring lens tray 101, and a bevel, spiral bevel or hypoid gear arrangement would be used to transfer power from the motor 106a to the lens tray 101. One of ordinary skill in the art would recognize that any known gear arrangement could be used to connect the motor 106a drive shaft to the lens tray 101 without departing from the spirit and scope of the present invention.

The motorized interchangeable lens system 100 may optionally include imaging hardware, such as the imaging element, focusing component, image stabilizers, additional lenses, filters, iris aperture etc. These imaging hardware components may be housed in the imaging unit 107 or housed separately. The imaging element may be any kind of device used for capturing photographic images, including photo-sensitive film, a CCD image sensor, or a CMOS image sensor. One of ordinary skill in the art would recognize that any kind of imaging element could be used without departing from the spirit and scope of the present invention.

A focusing component may be any component that allows the light from the lens to be focused on the imaging element. This usually involves moving the imaging element toward or away from the lens, moving the lens toward or away from the imaging element, or moving a focusing component within the path of light between the lens and the imaging element. Alternatively a liquid lens, which changes focal length in proportion to the strength of an electric field, or mirrors may also be used to focus. In the present invention, focusing may be accomplished by moving the imaging element, moving a focusing lens, moving an individual lens or stack of lenses within the lens tray, or moving the entire lens tray. One of ordinary skill in the art would recognize that any kind of focusing element could be used without departing from the spirit and scope of the present invention.

One method of moving the lens toward or away from the imaging element involves using a voice coil motor design. This is done by mounting the lens or lens stack into the optical window opening by using springs. A first magnet is attached to the lens assembly and a corresponding second magnet is placed outside the light pathway between the lens assembly and the imaging element. One of the magnets should be an electromagnet, but the other may optionally be a permanent magnet. Energizing the electromagnet and adjusting the current causes the lens assembly to be pulled toward or pushed away from the imaging element.

The motorized interchangeable lens system 100 may also cooperatively interface with a separate imaging system not integrated into the motorized interchangeable lens system 100. The lens cover assembly 104 is also optional and may include one or more additional lenses, one or more filters, or a glass or plastic cap or cover to protect the lenses in the lens tray from dust and moisture. The lens cover assembly may be incorporated into the body of the mobile phone, camera, or other imaging device that incorporates the motorized interchangeable lens system 100. It is not necessary that the lens tray 101 be annular. One of ordinary skill in the art would recognize that the lens tray may be annular, circular, rectangular, arced, or any shape that is suitable for the space in which the motorized interchangeable lens system is used, without departing from the spirit and scope of the present invention.

FIG. 1, and the other figures depicting lens trays throughout this specification, shows only one lens 103 in the optical window openings 102. It should be understood that simplification of the drawings should not be interpreted as limiting. Any number of optical window openings 102 may be used, and each may be referred to by element 102. One or more of the optical window openings 102 may have no lens 103 at all. One of ordinary skill in the art would recognize that the lens 103 may generically refer to any lens in the lens tray 101, including a lens 103 that is lined up with the imaging unit 107, and hidden from view in the drawing.

Figure 2:
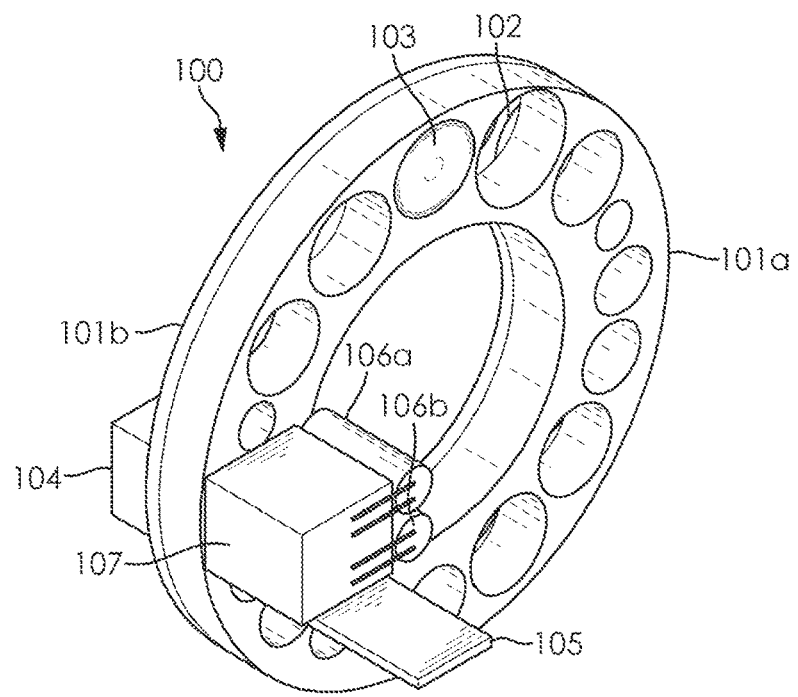
FIG. 2 is a perspective view of a motorized interchangeable lens system with multiple annular lens rings with attached motors according to an embodiment of the present invention.

FIG. 2 shows a motorized interchangeable lens system with two lens trays, which move independently of each other. In this embodiment of the invention, a first motor 106a controls the movement of the first lens tray 101a, and a second motor 106b controls the movement of the second lens tray 101b. The control circuitry for both motors is incorporated into the same interface board 105. Independent movement of the two lens trays 101 allows the lenses in each lens tray 101a, 101b, to be combined to produce a variety of desirable focal lengths, allowing a focal length that is suitable for almost any situation. Alternatively, the second lens tray 101b could carry a number of photographic filters, while the first lens tray 101a carries lenses of various focal lengths. When the second lens tray 101b carries photographic filters, at least one of the optical window openings 102 may be left empty to provide the user with a "no-filter" option for taking photos. This would allow the user to pick any of the available filters to use with any of the available lenses, presenting a variety of choices to the user.

FIG. 2 shows only one lens 103, but this should not be interpreted at limiting. The lens tray 101 may have any number of optical window openings 102 and zero or more of those optical window openings may hold a lens 103 or remain empty. Even if all optical window openings in any lens tray described herein are empty, the empty optical window openings may still serve the purpose of providing varying aperture sizes to change the amount of light entering the imaging unit 107. Although an iris aperture is the preferred method of changing aperture sizes, a lens tray with various optical window opening sizes may also be used and may even be preferred under certain circumstances. Therefore, even a lens tray with no lenses remains within the spirit and scope of the present invention. In addition, although the first lens tray 101*a* and second lens tray 101*b* appear to have the same number of optical window openings 102, this need not be the case. The second lens tray 101*b* may have more or fewer optical window openings 102 than the first lens tray, and the total number of possible lens combinations could be as many as the number of optical window openings 102 in the first lens tray 101 multiplied by the number of optical window openings 102 in the second lens tray 101*b*.

The concepts discussed with reference to FIG. 2 may be further expanded to implement three or more lens trays.

Figure 3:
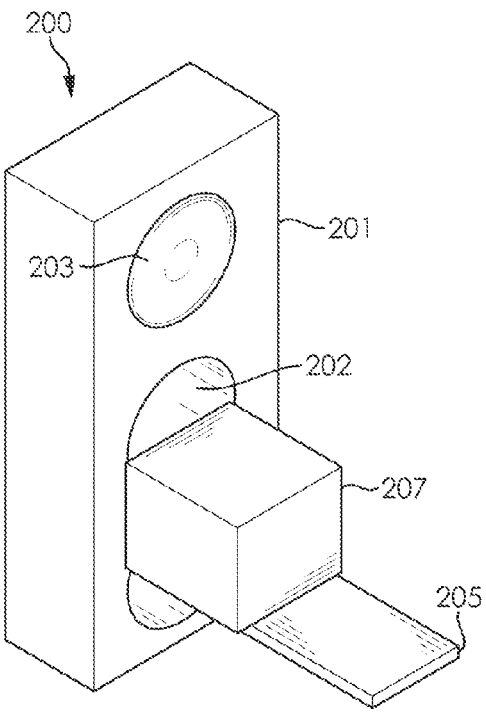
FIG. 3 is a perspective view of a motorized interchangeable lens system with a single rectangular lens tray having a single array of lenses according to an embodiment of the present invention.

FIG. 3 shows the motorized interchangeable lens system 200 with the optical window openings 202 of the lens tray 201 arranged in a one-dimensional array. This arrangement of lenses may be able to hold fewer lenses than the annular design, for example, before the lens tray becomes unfeasibly long. However, the dimensions required for use within something like a mobile phone would be easy to determine and space within the mobile phone could be easily provided in a situation where curves might be more difficult to deal with. The simplicity of the device in FIG. 3 is considered a fair trade for reduced lens options.

Motors are not shown from FIG. 3 on, but a variety of different motor and gear mechanisms which could be used to move the lens tray 201 into the desired position. The motor 206 could be arranged perpendicular, parallel, transverse, or in any position and combined with worm gears, bevel gears, spiral, hypoid, or rack and pinion gear arrangements configured to move the lens tray as desired. The linear motor can also be used for quieter or quicker movement. Alternatively, a piezo motor can also be used to move the lens tray. One of ordinary skill in the art would recognize that any motor and gear arrangement could be used without departing from the spirit and scope of the present invention.

Figure 4:
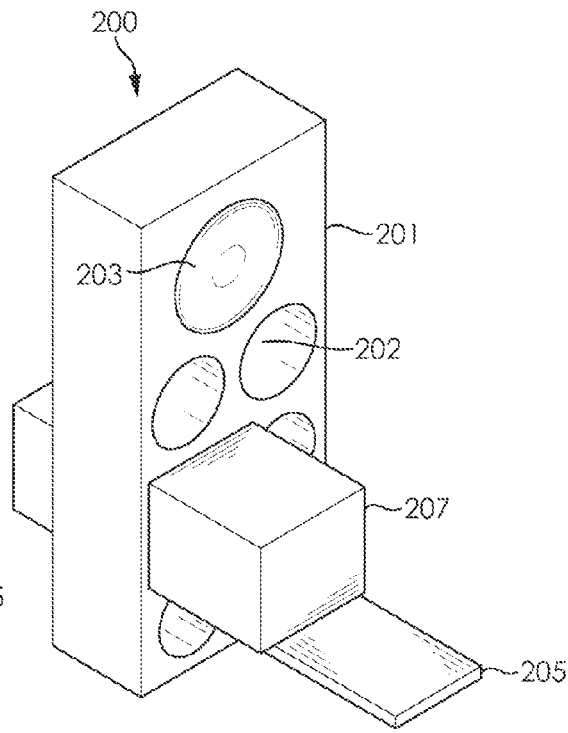
FIG. 4 is a perspective view of a motorized interchangeable lens system with a single rectangular lens tray having multiple arrays of lenses according to an embodiment of the present invention.

FIG. 4 shows a motorized interchangeable lens system 200 with optical window openings and lenses arranged two-dimensionally. As seen in FIG. 4, the arrangement of lenses can be described as having at least three arrays: one array on the left, one array on the right containing the optical window opening labeled 202, and one array in the center containing just one lens 203. Alternatively, the arrangement of optical window openings could be described as a first array at the top with just one lens 203, a second array with two optical window openings just below the first array, and so on to the bottom array. No matter the arrangement of optical window openings, their arrangement can be described as having a number of arrays with one or more optical window openings in each array.

In the case of FIG. 4, an x-axis motor moves the lens tray along the x-axis and a y-axis motor moves the lens tray along the y-axis. Combining the motion of both the x-axis and y-axis motors allows the lens tray to be positioned at any of the lenses on the lens tray. The optical window openings 202 may be of varying sizes and may even be large enough to overlap into the next row, as illustrated by the lens 203. This allows for varying sized optical window openings 202 to be strategically placed within the lens tray 201 in order to minimize the space used by the lens tray 201. The x-axis motor and y-axis motor are capable of positioning the lens tray 201 in any position necessary to select the desired lens.

The system of motors and gears required to move the lens tray 201 in two dimensions may be somewhat more complicated than the motor system required for moving a lens tray in one dimension. However, mechanical systems for moving items on a plane in two dimensions are available in the prior art and one of ordinary skill in the art would recognize that any of such systems could be adapted for use with the present invention without departing from the spirit and scope of the present invention.

Figure 5:
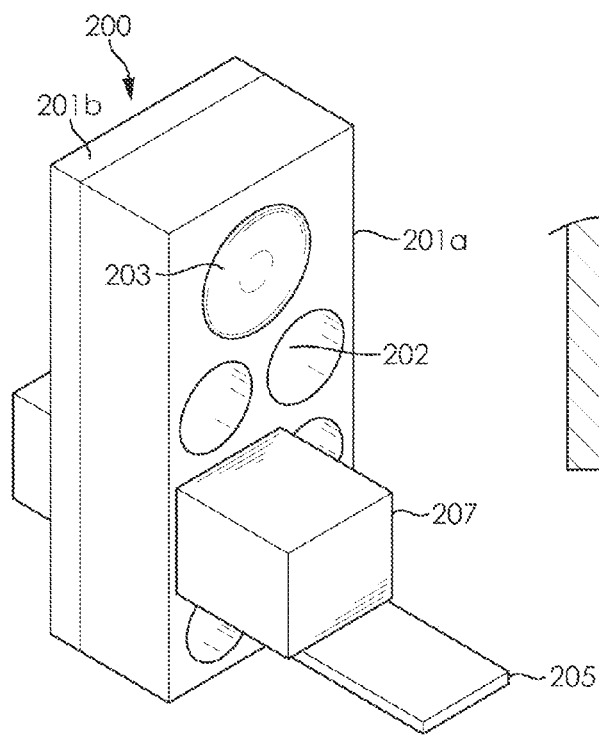
FIG. 5 is a perspective view of a motorized interchangeable lens system with multiple rectangular lens trays, each having multiple arrays of lenses according to an embodiment of the present invention.

FIG. 5 shows a motorized interchangeable lens system 200 with multiple rectangular lens trays 201. In this particular embodiment, a more complex motor system would be required in order to move each lens tray independent of each other. However, if the lens trays were intended to only be moved in unison, both lens trays could be moved by the same system of motors and gears as is used to move a single tray.

FIG. 6 shows a side cutaway view of a lens stack held in an optical window opening 102, 202. According to some embodiments of the invention, the optical window openings 102, 202 may hold nothing, an optical filter, a single lens, or may hold a stack of multiple lenses. A stack of lenses used for general purpose, or somewhat wide angle photography can be reversed in another optical window opening to produce high magnification of close up subjects for macro photography. Stacking or coupling lenses can also aid in correcting aberrations or distortions created, for example, by differences in the refraction rate of different colors of light through a material. Stacking lenses can also help in achieving greater magnification, such as that required for macro, or extreme close-up photography. When the optical window opening 202 holds no optical element, it simply does not refract the light. This can be useful in a variety of situations. First, some lenses or lens stacks require no other lenses in order to produce the desired result. This is explained in more detail with reference to FIG. 8 below. In addition, the interchangeable lens system may be configured to allow attachment of external optical attachments, including, but not limited to, microscopes, telescopes, external lenses, filters, or other optical elements. In this situation, lenses on the lens trays may interfere with the desired effect of the external optical attachment, so an empty optical window opening would be selected to prevent unwanted refraction.

FIGS. 7*a*-7*g* show various lens tray shapes and arrangements that can be rearranged to produce a variety of desirable results. Each of the lens trays may include a reflector 708 such as a prism, mirror, or mirror system which changes the direction of the light, allowing for a greater distance to be placed between the refractive lens and the imaging unit 707 while still maintaining a compact form factor. Each arrangement, along with some unique properties of each, will be explained in further detail below.

Figure 7A:
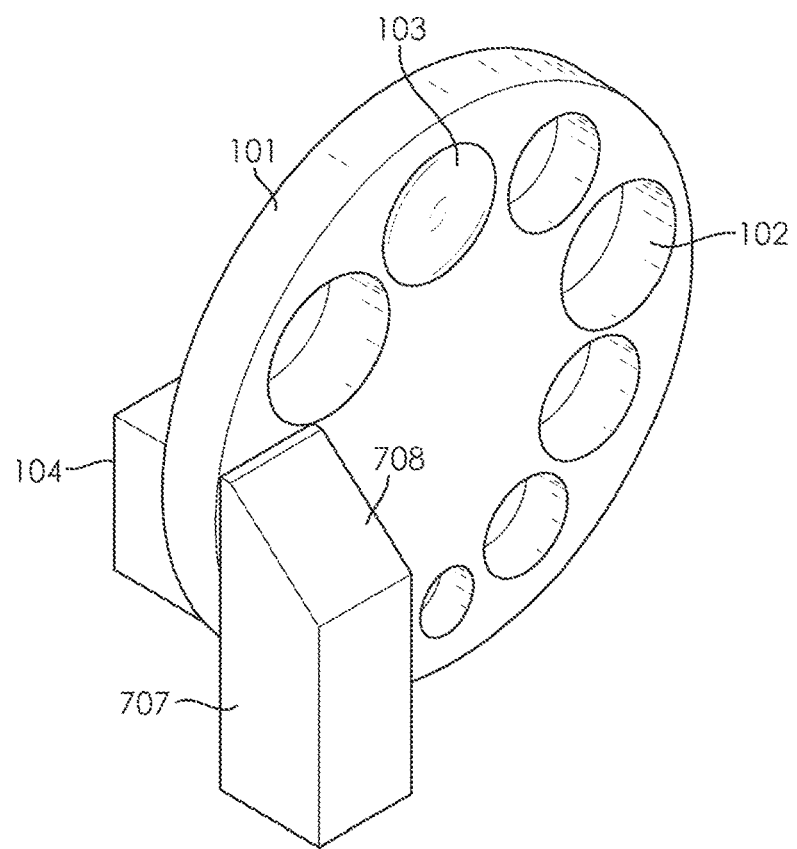
FIG. 7a shows an arrangement of a lens tray, a reflector, and an imaging unit arrangement according to an embodiment of the present invention.

FIG. 7*a* shows a basic arrangement of a lens tray combined with a reflector 708 which changes the direction of the light coming through the lens tray. FIG. 7*a* shows how the reflector may be combined with a lens tray to provide additional function and flexibility. The imaging unit 707 is arranged on the exit end of the reflector, allowing flexibility to increase the distance the light travels between the lens and the imaging unit 707 without increasing the thickness of the camera system. In one embodiment, the interchangeable lens system of FIG. 7*a* is arranged in a mobile phone such that the circular lens tray lies flat behind the screen of the mobile phone. The lens cover assembly 104 is incorporated into the body of the mobile phone such that the camera opening is visible on the back of the camera. The reflector 708 redirects the light along the length or width of the mobile phone. Without the reflector 708, the imaging unit 707 would have to be oriented along the same vector of the lens cover assembly 104, as depicted in FIGS. 1-5, and the thickness of the mobile phone would limit the focal length possible with the interchangeable lens system. The reflector provides much more flexibility in the distance between the lens and the imaging unit 707, and thus flexibility in the maximum focal lengths possible with the interchangeable lens system.

Figure 7B:
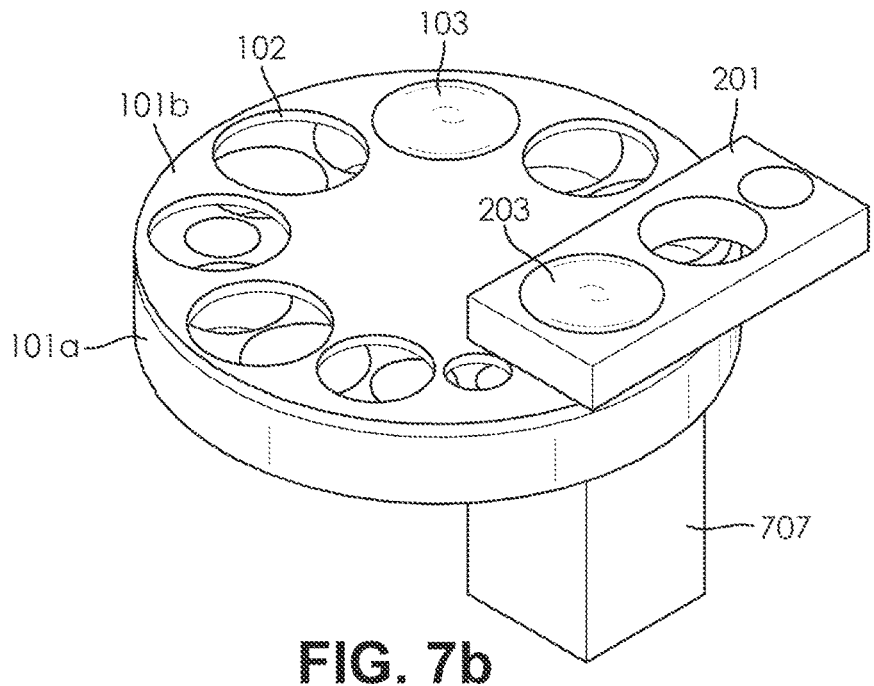
FIG. 7b shows an alternate arrangement of various lens trays and an imaging unit arrangement according to an embodiment of the present invention.

FIG. 7b shows a lens tray arrangement with three lens trays, showing that more than two lens trays may be used and the lens trays need not be of the same shape, size or type. The first lens tray 101a is thicker than the second lens tray 101b. The optical window openings 102 of the first lens tray 101a may hold a stack of lenses, as depicted in FIG. 6, or may hold various single lenses 103 at various positions within the optical window openings 102 of the lens tray 101a. The second lens tray 101b is thinner than the first lens tray 101a and may contain either single lenses or optical filters. The single lenses may be designed to work in combination with one or more of the lenses 103 or lens stacks of the first lens tray 101a. The third lens tray 201, is a rectangular lens tray 201. The lenses 103, 203 of all the trays would combine to produce the desired focal length, and/or optical effect and each of the lens trays may have one or more empty optical window openings 103, 203. These empty optical window openings may be combined with the lenses to produce a desirable optical effect or focal length where fewer than three separate optical elements are required to achieve the desired result. The imaging unit 707 is arranged perpendicular to the lens trays to show that the interchangeable lens system need not necessarily use a reflector FIG. 7a 708.

Figure 7C:
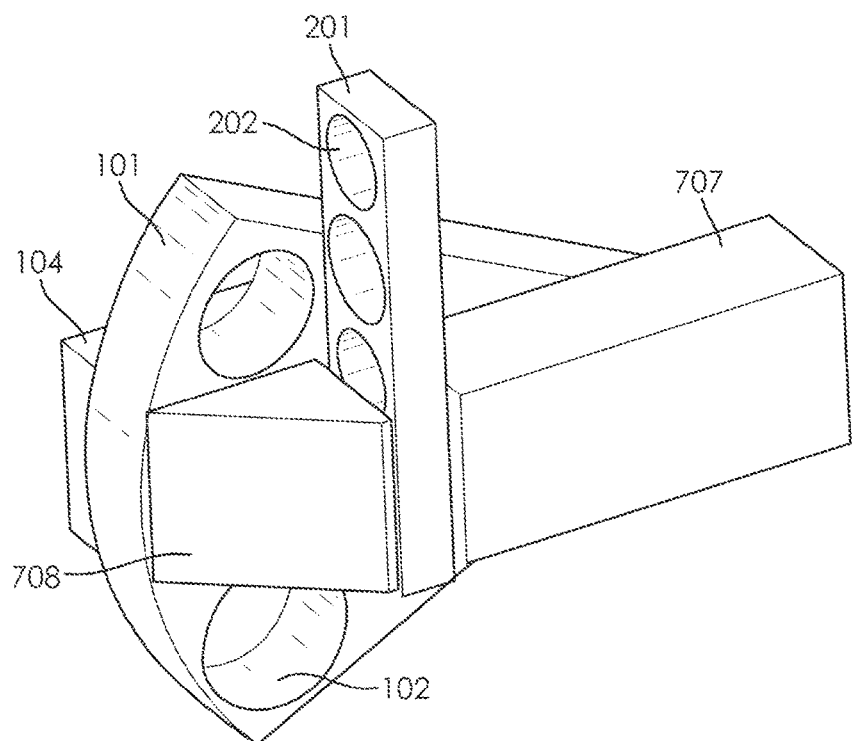
FIG. 7c shows a sector-shaped lens tray, a reflector, and a rectangular lens tray on different plane from the sector shaped lens tray, and an imaging unit arrangement according to an embodiment of the present invention.

FIG. 7c shows how a reflector 708 may be used to combine two lens trays of different shapes arranged on different planes relative to each other. The first lens tray 101 is in the shape of a sector, or a wedge cut out of a circle. Light enters through the lens cover assembly 104 and passes through a optical window opening 102 in the first lens tray before entering a reflector 708, which changes the direction of the light to be parallel to the plane of the first lens tray 101. The second lens tray 201 is then arranged after the reflector 708 and orthogonal to the first lens tray 101. Light passes through a optical window opening 202 of the second lens tray before reaching the imaging unit 707.

Figure 7D:
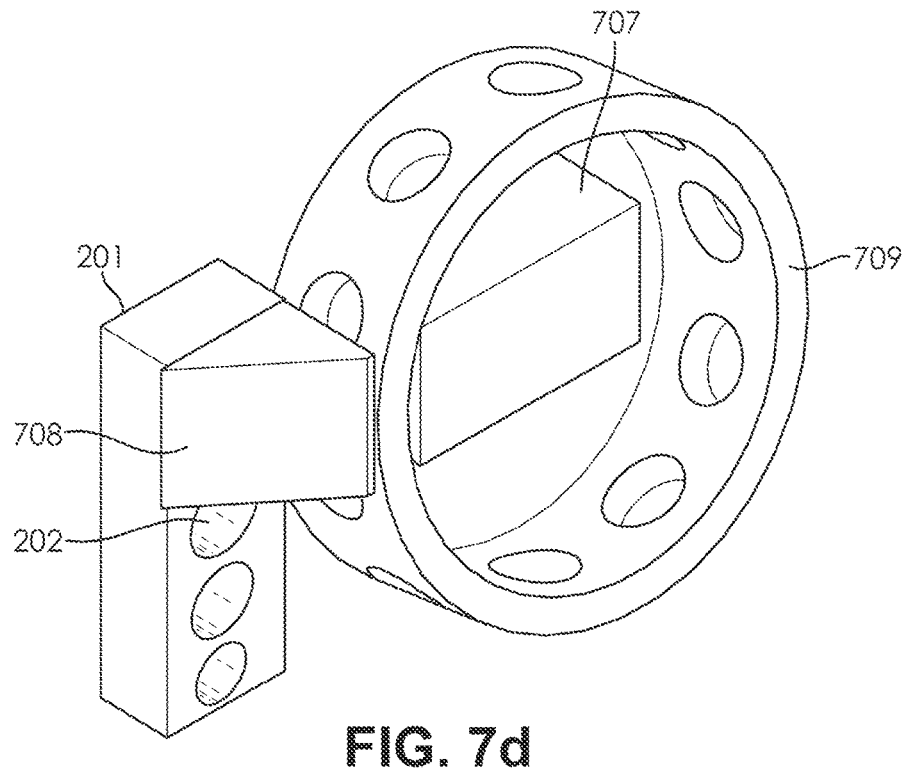
FIG. 7d shows a rectangular lens tray, a reflector, a barrel shaped lens tray, and an imaging unit arrangement according to an embodiment of the present invention.

FIG. 7d shows a combination of a rectangular lens tray 201, a reflector 708, and a barrel lens tray 709 that encircles the imaging unit 707. The barrel lens tray 709 is different from previously described lens trays 101, 201 because it is not planar. The barrel lens tray 709 is a cylindrical ring shape with an outer wall and inner wall. Although FIG. 7d depicts a fully circular ring, the barrel lens tray 709 may be an arc or sector that is less than the whole cylindrical ring shape. In other words, the ends of the barrel lens tray 709 need not necessarily meet each other to form a complete circle. This type of lens tray is similar to the rectangular lens tray 201 of FIG. 3, except the planar surface is curved to form an arc along the length of the rectangle. When the ends of the rectangle of sufficient length are curved to the point of meeting each other, a barrel lens tray, as depicted in FIG. 7d, is formed.

On the barrel lens tray 709, instead of having optical window openings arranged along a plane, they are arranged along the cylindrical wall, and instead of rotating or sliding the lens tray, the barrel lens tray 709 is spun on its central axis. The reflector 708 makes using the barrel lens tray 709 possible by changing the direction of the light that enters through the rectangular lens tray 201. This allows the barrel lens tray 709 to be oriented so that the overall thickness of the lens tray combination can be minimized.

Figure 7E:
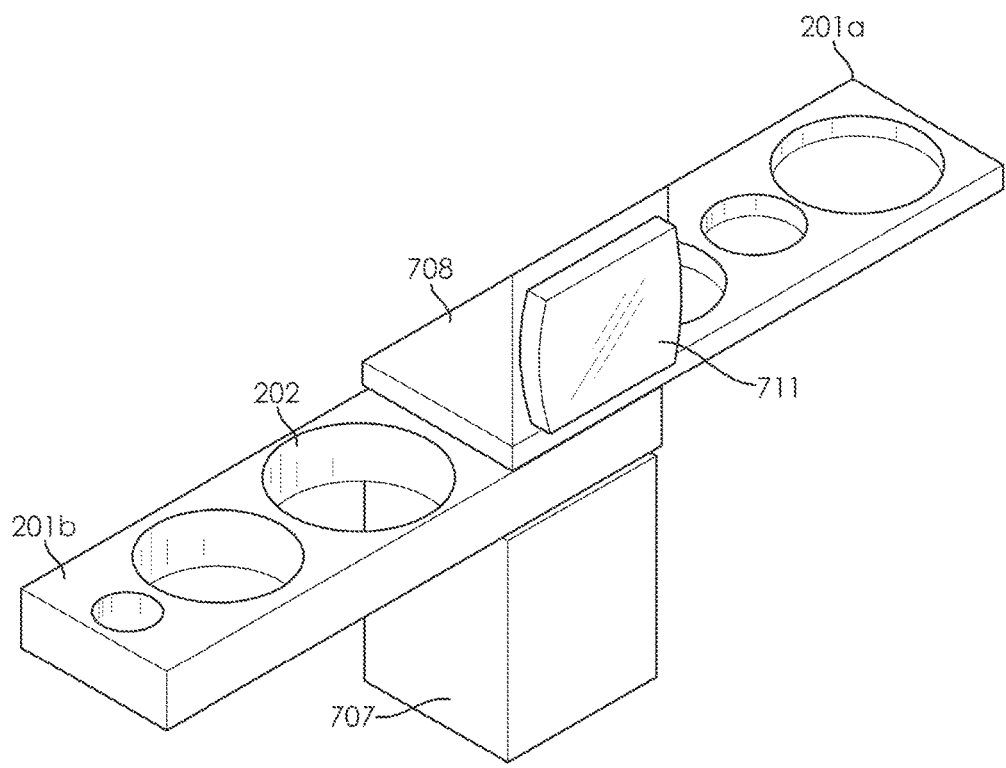
FIG. 7e shows a dual rectangular lens tray, reflector, and imaging unit arrangement according to an embodiment of the present invention.

FIG. 7e shows a combination of a reflector 708 and two rectangular lens trays 201a, 201b, but in this instance, the two lens trays 201a, 201b lie on parallel planes and light travels through the reflector 708 before reaching the lens trays 201a, 201b. The reflector 708 opening is protected by an optical cover window 711 which allows light to pass through, but keeps out moisture and dust. In this example, the imaging unit 707 would lie along the length or width of the mobile phone or camera device that incorporates the interchangeable lens system.

Figure 7F:
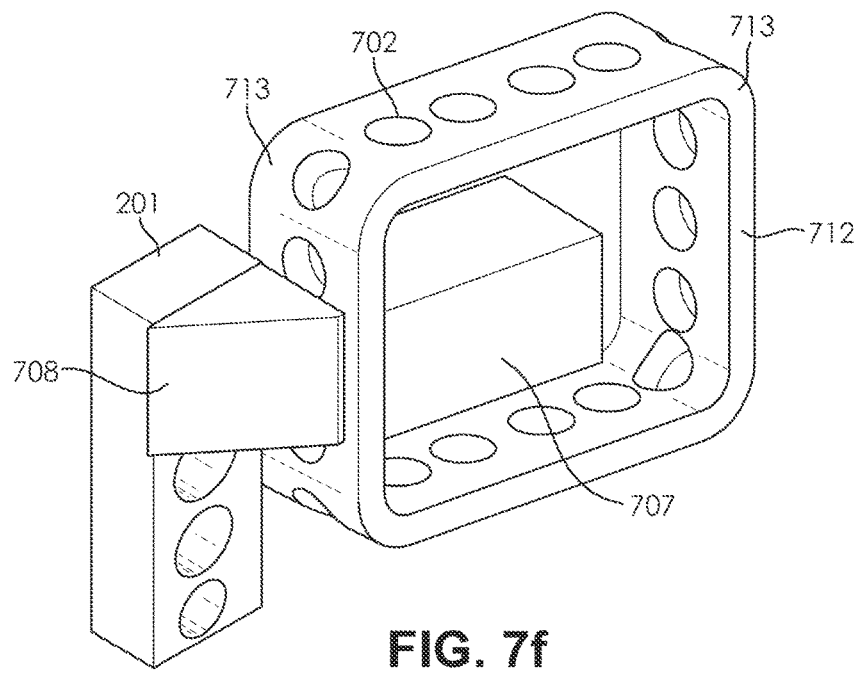
FIG. 7f shows a rectangular lens tray, a reflector, an imaging unit and a flexible band lens tray arrangement according to an embodiment of the present invention.

FIG. 7f is similar to FIG. 7d, but the barrel lens tray 709 is a flexible band barrel lens tray 712 made of rubber, silicone, fiber, or a chain loop of hinged rigid segments. The optical window openings 702 hold the optical elements such as lenses or filters. As the lens tray 712 is rotated to select the desired lens, the flexible band 712 bends around the rounded corners 713, reducing the amount of space required to hold the interchangeable lens system. The rounded corners 713 are configured to have a large enough radius of curvature so that the rigid lenses can traverse the rounded corners 713 without jamming or binding the flexible band barrel lens tray.

The barrel lens trays of FIG. 7d and FIG. 7f, whether made of flexible material or rigid material may alternatively have material cut out of the barrel between the optical window openings, forming triangular, rectangular or rounded teeth on one or both sides of the barrel. This makes the lens tray lighter, and/or more flexible. One of ordinary skill in the art would recognize that adding or removing excess material from any lens tray described herein may be done without departing from the spirit and scope of the present invention.

Figure 7G:
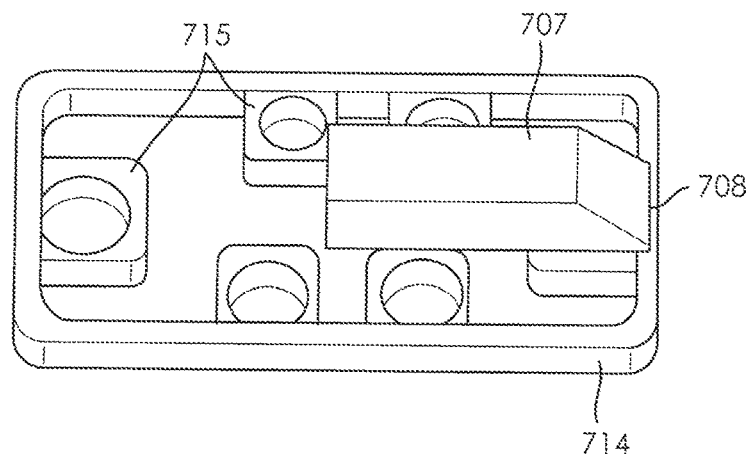
FIG. 7g shows a series of lens optical window openings arranged on the inside surface of a flexible band lens tray, a reflector and an imaging unit according to an embodiment of the present invention.

FIG. 7g depicts a different type of flexible lens tray, where the flexible band 714 is attached to several optical window traylets 715. According to an embodiment of the present invention illustrated in FIG. 7g, a traylet 715 is made of a tab of material separated from the rest of the lens tray, but connected to the perimeter of the lens tray on one side. A lens tray, whether flexible, rigid, planar, or some other shape, may contain multiple traylets 715. The traylets 715 may be separated from each other by gaps in the tray material or otherwise identifiable as individual portions of the lens tray. Alternatively, a traylet may be a section of the lens tray that contains two or more of the optical window openings of the lens tray. A Traylet may also be blank, or contain no optical window opening. The material forming the traylets 715 may be flexible or rigid.

As shown in FIG. 7g, each optical window traylet 715 is formed from a tab of material extending from the inner surface of the flexible band. The flexible band can be made of rubber, silicone, fiber, or a chain loop of rigid segments connected by hinges. Each optical window traylet is capable of remaining empty, or holding a single optical element such as a lens, stack of lenses or filter. Alternatively, the function of an empty window can be achieved simply by having a sufficiently large gap on the flexible band 714 where there is no optical window traylet 715. The flexible band 714 allows a larger number of optical element options to be placed within available space constraints. One of ordinary skill in the art would recognize that traylet 715 may also be formed from a tab of material extending from the inner surface, outer surface, or both the inner and outer surface of the flexible band without departing from the spirit and scope of the present invention.

FIGS. 7a-7g depict various combinations of lens trays 101, reflectors 708, and imaging units 707 in a variety of arrangements suitable for achieving desirable focal lengths and optical effects while fitting the interchangeable lens system within the space constraints typical of modern mobile devices. One of ordinary skill in the art would recognize that the various elements of FIGS. 7a-7g can be mixed and matched to produce any number of additional combinations without departing from the spirit and scope of the present invention.

Figure 8:
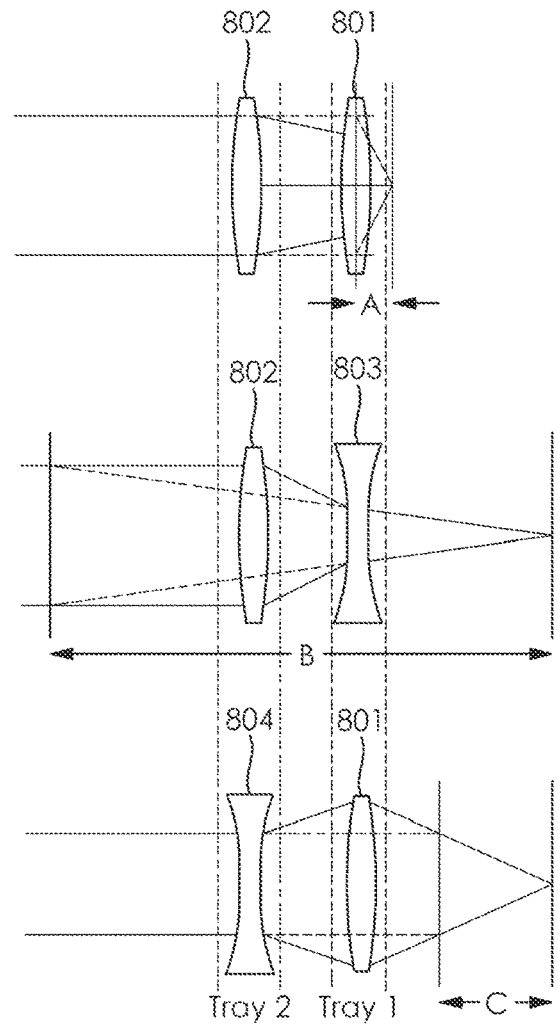
FIG. 8 is a diagram of how two lenses in separate lens trays would work together to produce a desired result according to an embodiment of the present invention.

FIG. 8 shows how lenses in two different lens trays can be combined to produce a variety of desirable effects. The lens combination at the top is labeled a macro lens combination. The combination of lens D 801 in tray 1 and lens E 802 in tray 2 produces a short focal length A, which has a high magnifying effect on objects brought close to the camera lens.

The middle lens combination of FIG. 8 is labeled as telephoto. The combination of lens F 803 in tray 1 and lens E 802 in tray 2 produces a relatively long focal length B which effectively enlarges objects that are far away from the lens. Note that the lens E 802 used in tray 2 for the macro lens combination may be the same lens E 802 used in tray 2 for the telephoto combination. However, FIG. 8 is used for illustration purposes only, and is not intended to be limiting. One of ordinary skill in the art would understand that one lens, either in tray 1 or tray 2, may be used in a variety of lens combinations to achieve a variety of different focal lengths for a variety photographic purposes.

The bottom lens combination of FIG. 8 is labeled as wide angle. The wide angle combination uses the same lens D in tray 1 as the macro combination, but the lens in tray 2 is switched to lens G 804. This lens combination produces a relatively short focal length C that has a wide angle effect on objects that are far from the lens. One of ordinary skill in the art would recognize that any combination of lenses, filters, optical devices, or even empty optical window openings could be used to achieve whatever focal length or other optical effect is desired.

Figure 9:
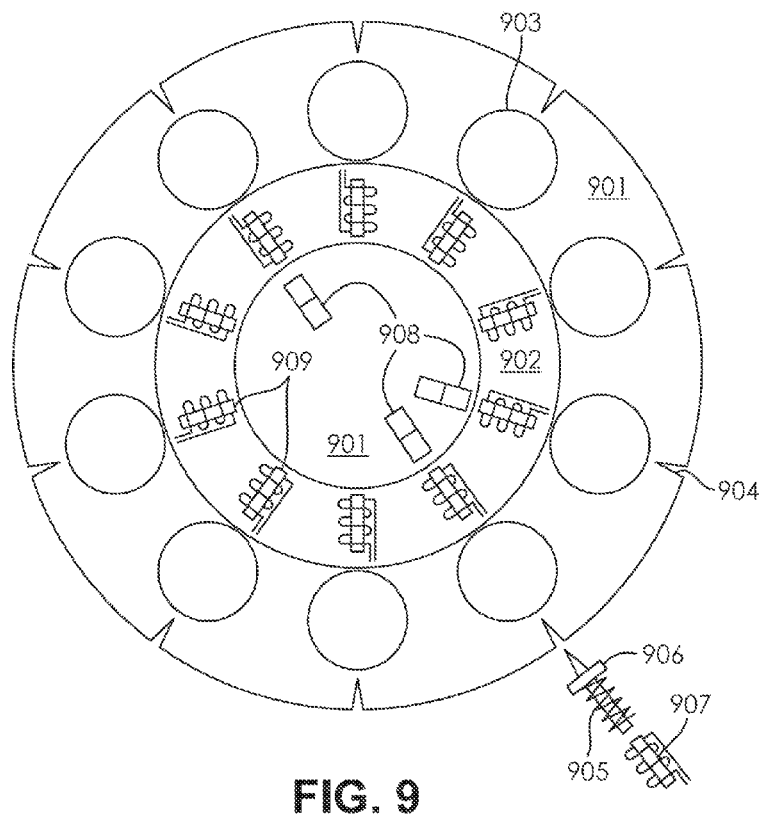
FIG. 9 is a diagram of a circular lens tray with magnetic motor and a locking mechanism according to an embodiment of the present invention.

FIG. 9 shows a diagram of a motor for rotating a circular lens tray and a system for locking a lens tray in place according to an embodiment of the present invention. In one embodiment of the present invention, a motor and gears may be used to rotate, slide, or otherwise move the lens tray into a desired position. Alternatively, a motor as shown in FIG. 9 may be used to move the lens tray without the need for a system of gears. The lens tray makes up the rotor 901 of a motor similar to a brushless electric motor. The central portion of the lens tray rotor 901 has permanent magnets 908 attached to it and a stator 902 has electromagnets 909 attached. For each lens, there is a corresponding electromagnet 909 and locking notch 904. The locking notch 904 corresponding to each lens 903 is positioned around the outside edge of the lens tray rotor 901.

A magnetic locking pin 906 is loaded by a spring 905 and interfaces with the locking notches 904 to hold the lens tray rotor at the desired position corresponding to a selected lens 903. The magnetic locking pin 906 is controlled by a locking electromagnet 907. When the locking electromagnet 907 is turned on, it pulls the magnetic locking pin 906 toward it, compressing the spring 905 disengaging the pin from the locking notch 904 and allowing the lens tray rotor 901 to rotate freely. When the electromagnets 907, 909 are off, they apply no force on the permanent magnets 908 or the magnetic locking pin 906 and the spring 905 loaded locking pin 906 holds the rotor 901 securely in position by interfacing with a locking notch 904.

The appropriate lens 903 can be selected by the following steps. In step 1, the locking electromagnet 907 is turned on. Turning on the locking electromagnet 907 causes the magnetic locking pin 906 to move toward the locking electromagnet 907, compressing the spring 905, and disengaging the magnetic locking pin 906 from the locking notch 904. In step 2, turning on and off the electromagnets 909 in the correct sequence causes the lens tray rotor 901 to rotate in one direction or the other. In step 3, a hall-effect sensor, light sensor, or another sensing device (not shown), detects when the chosen lens 903 is approaching the correct position. When the rotor reaches the desired position, the electromagnets 909 corresponding to the desired lens remain powered on in the correct polarity to stop the rotor in the desired position. In step 4, the electromagnets 907, 909 are turned off and the spring 905 pushes the magnetic locking pin 906 to engage with the locking notch 904 corresponding to the appropriate lens 903. The locking pin 906 then holds the lens tray rotor in place without requiring the electromagnets to be powered on.

Although the above rotation and locking mechanism is applied to a circular lens tray with a magnetic locking pin, many variations can be made. The permanent magnets 908 may be replaced with electromagnets. The relative positions of the stator and rotor may be swapped. The positions or orientations of the permanent magnets 908 and/or the electromagnets 909 can be changed, i.e. placed on the outer edge of the tray, or arranged with the poles being orthogonal, rather than parallel to the plane of the tray. A different locking pin design may be used. The locking pin may be placed on the rotating lens tray. The position of rotor brushes can be changed. The system may also be adapted for linear movement rather than rotation. One of ordinary skill in the art would recognize that many changes to the system could be made without departing from the spirit and scope of the present invention.

Figure 10:
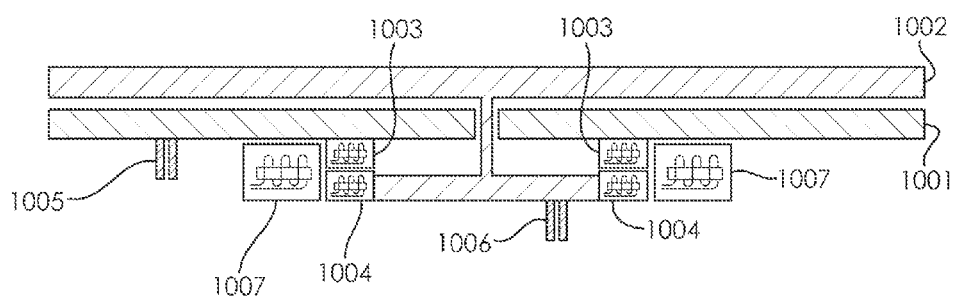
FIG. 10 is a cutaway side view of a magnetic motor for moving two circular lens trays according to an embodiment of the present invention.

FIG. 10 shows a side cutaway view of an electromagnetic motor designed for an interchangeable lens system using two lens trays. The first tray 1001 is shown with two first rotor electromagnets 1003 attached to it. Although two first rotor electromagnets 1003 are shown, it is for illustration purposes only, and more electromagnets may be used without departing from the spirit and scope of the present invention. The first rotor electromagnets 1003 are powered through the first rotor brushes 1005 which maintain electrical contact with stationary electrical contacts. The second tray 1002 has two second rotor electromagnets 1004 attached to an extension which passes through the center of the first tray 1001. The second rotor electromagnets 1004 are powered by a set of second rotor brushes 1006 which maintain contact with a corresponding set of stationary electrical contacts. The stator electromagnets 1007 are positioned such that they will interact with both the first rotor electromagnets 1003 and the second rotor electromagnets 1004. As in the system described in FIG. 9, the electromagnets are turns on and off in the proper sequence to produce the desired movement.

The rotor electromagnets may be replaced with permanent magnets, but in this particular physical arrangement, it is desirable that the rotor magnets be electromagnets. Unless sufficient magnetic shielding is used or the rotor magnets are placed so that they don't interfere with each other, electromagnets are a preferable option here because they can be turned on and off selectively, thus making the task of moving one tray at a time somewhat simpler.

The above described electromagnetic motor may be adapted or expanded to move three or more layers of lens trays such that each magnet on the stator interfaces will all of the rotors. The rotors may be rotated simultaneously by energizing the electromagnets on each tray, or the rotors may be moved individually by only energizing the electromagnet on the tray to be moved. Alternatively a piezoelectric motor can be used for both movement and locking the lens tray. One of ordinary skill in the art would recognize that any motor could be used without departing from the spirit and scope of the present invention.

Figure 11:
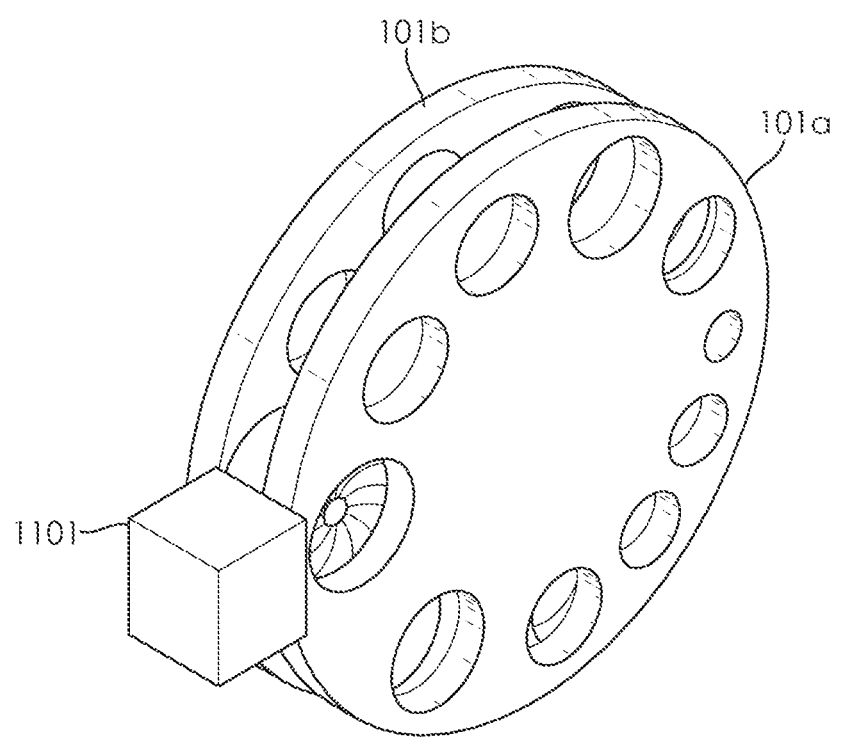
FIG. 11 shows an iris aperture arranged between two circular lens trays according to an embodiment of the present invention.

FIG. 11 is an illustration showing how an iris aperture may be incorporated into the interchangeable lens system. The iris aperture 1101 in FIG. 11 is shown placed between first lens tray 101*a* and second lens tray 101*b*. One of ordinary skill in the art would recognize that the iris aperture 1101 could be place at any functional position in FIG. 11 or combined with any number of arrangements depicted or made obvious by FIGS. 7*a*-7*g* without departing from the spirit and scope of the present invention.

Figure 12:
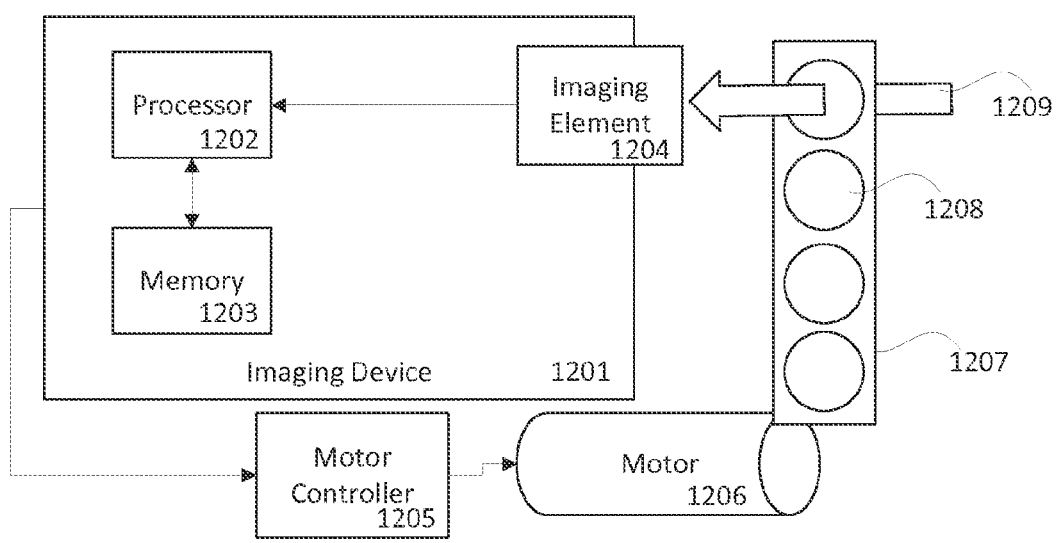
FIG. 12 is block diagram showing the integration of the motorized interchangeable lens system with a mobile imaging unit according to an embodiment of the present invention.

FIG. 12 shows a block diagram of the motorized interchangeable lens system incorporated into an imaging device 1201 such as a mobile phone, camera, or camcorder. The imaging device 1201 includes a programmable apparatus comprising a processor 1202 and a memory 1203 or other computer readable medium for storing program instructions to be executed by the processor 1202. The memory may also be used to store images received by the imaging element 1204. The imaging device 1201 sends commands to the motor controller 1205, which moves the lens tray 1207 to align one of the optical elements 1208 with the imaging element 1204. An optical element 1208 may be a lens, filter, or some other type of optical element. Light 1209 passes through the optical element 1208 to the imaging element 1204.

The imaging device 1201, such as a mobile phone, camera, or camcorder may have software and/or drivers installed which enable the user to control the motorized interchangeable lens system through a graphical user interface, or allow automatic control through system software. The user need not be aware of which optical element is used or when it is necessary to change the lens. For example, on a mobile phone, the camera software would receive input from the user to apply a filter, zoom in, zoom out, switch to macro mode, or adjust the aperture size. The device driver, which may be part of the camera software itself, or other software module on the phone would then determine how to move the lens tray to achieve the desired results for the user.

Figure 13:
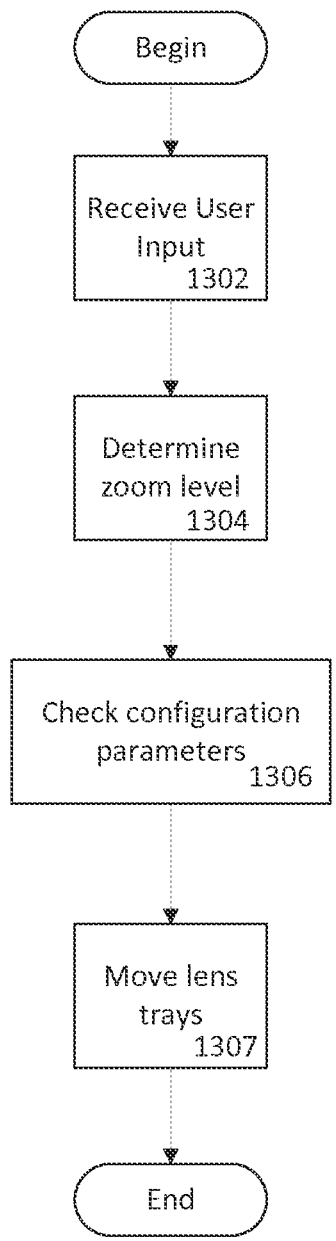
FIG. 13 is a flowchart showing how camera software integrated with the motorized interchangeable lens system interprets user inputs and translates them into the appropriate lens tray positions.

FIG. 13 shows a flowchart depicting the software method for interpreting user inputs, determining the appropriate optical elements and moving the lens tray to the appropriate position. At step 1301, the software receives user inputs. User inputs are typically received through a Graphical User Interface (GUI) where icons, buttons and menus allow the user to choose commands. As an example the user may zoom using an on-screen slider, a touch screen gesture, or a software or hardware dial, wheel, or button. One of ordinary skill in the art would recognize that any method of zooming may be used without departing from the spirit and scope of the present invention.

In a basic camera app, the user often wants to achieve a certain zoom level in order to properly frame the subject and does not know or care what camera parameters or lens combination are used to achieve the desired result. The user will simply stop adjusting the zoom when the viewfinder or camera display screen shows an acceptable zoom level. Whatever zoom level the user chooses, the software will determine what set of lenses and what level of digital zoom should be used in order to achieve the user-selected zoom level. The primary feature of the software is its ability to choose the appropriate lens combination given user inputs. Although this particular example uses zoom to describe the software function and features, other camera parameters, such as shutter speed, aperture size, filters, film speed, etc. can also be automatically determined based on user inputs.

At step 1304, the camera software interprets the user's input. The user's input may include a variety of changes to camera parameters and will not necessarily consist only of zoom commands. Therefore, the software determines what zoom level is required from the user's input.

At step 1306, the camera software checks configuration parameters to determine what lens tray positions would be required to achieve the user selected zoom level or focal length. The software determines lens tray positions by referring to a set of configuration parameters. The configuration parameters list each available zoom level or focal length with the lens tray positions required to achieve that zoom level or focal length. The available zoom levels or focal lengths may be stored in a file, array, table, or simply hard coded into the software. Because the user may choose a zoom level that may not be exactly the same as one of the available discrete zoom levels, the software finds the closest available discrete zoom level that is no higher than the user selected zoom level. Any remaining amount of zoom is done digitally. The lens tray positions stored under the configuration parameters refer to position sensor readings that correctly select the lenses required to achieve the desired zoom level or focal length. The tray position may be sensed using hall-effect sensors, light sensors, barcode readers, motor position sensors, or determined from the relative movements from a currently known lens combination. One of ordinary skill in the art would recognize that there are a variety of ways to sense, or otherwise determine the position of the lens trays without departing from the spirit and scope of the present invention.

Once the lens tray positions are determined from the configuration parameters, the camera software sends commands to move the lens tray to the correct position. The camera software monitors the lens tray position with sensors, and continues sending movement commands until the desired lens tray position is reached. Alternatively, the camera software may use current knowledge of the lens tray positions and send movement commands known to produce the desired lens tray positions.

The camera software may also automatically control an iris aperture incorporated in to the motorized interchangeable lens system. If the user wants to capture fast action or take a photo in low light conditions, the user can set the camera to action mode, or a sensor can detect the low light conditions. In either case, the software responds by sending a command to the iris aperture to increase the aperture size and select the general purpose lens. If the user directs the camera to zoom in using the camera software, the software will command the motor to move the lens tray in order to select the telephoto lenses.

A camera software for more advanced users, or a "pro" mode may put the user in direct control of which lens and which aperture size to use. Depending on the optical element options available in each tray, the camera software may present different options to the user based on what is available and how the optical elements can be combined. If one of the trays includes filters, the camera software may include the filters as an option. If all the lens trays contain lenses, the camera software can determine what combinations of lenses are available, calculate each combination's Effective Focal Length (EFL), and present to the user the available options, or a spectrum of options without the user needing to select each lens on each tray individually. When a large number of effective focal lengths are available through a combination of lenses, the software may simply allow the user to zoom in and out, while the software automatically determines and selects the appropriate combination of lenses while using digital zoom smoothing to cover the gaps between each discrete level of optical zoom that is available.

Digital zoom merely takes the photo that was captured by the imaging element and enlarges it, without changing the resolution. This means that digital zoom incurs an image quality penalty and, in extreme cases, causes visible pixilation, blurriness, and distortion. Contrary to television and movie depictions, there is no "enhance" command that magically brings out minute details of a photo that has been digitally enlarged. Therefore, if a savvy user is concerned about preserving the native resolution of photographs, the software will allow the user to do away with digital zoom smoothing, and only use the discrete levels of optical zoom that are available through the various lens combinations in the lens trays.

Figure 14:
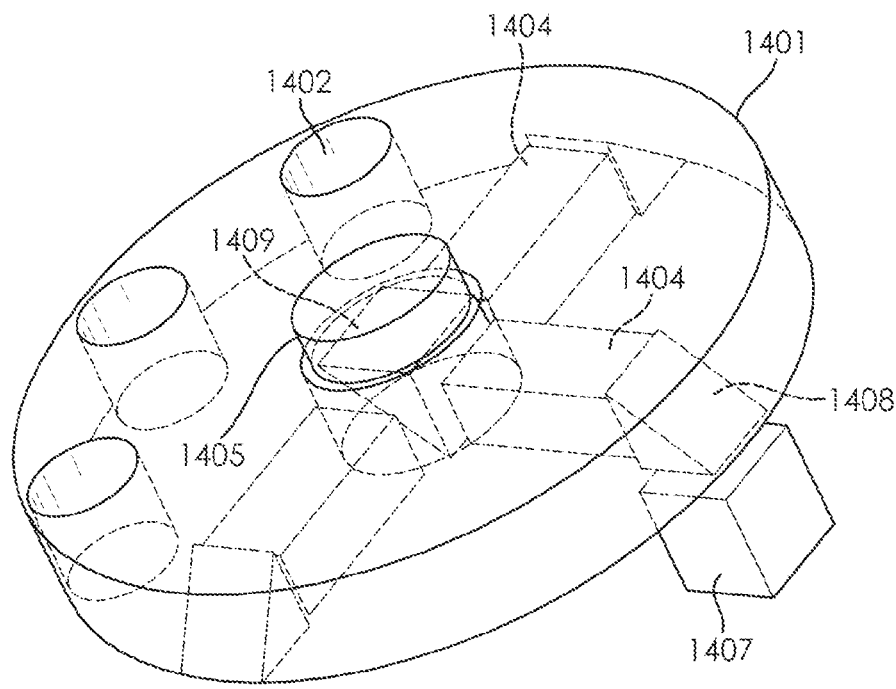
FIG. 14 shows an alternate lens tray with a centrally located reflector for accommodating lens combinations producing long focal lengths according to an embodiment of the present invention.

FIG. 14 shows an alternate embodiment of the lens tray 1401 designed to accommodate lens combinations with long focal lengths. In addition to the optical window openings 1402 included in other lens tray embodiments, there are also optical channels 1404 built into the lens tray parallel to the plane of the lens tray. An optical channel is a pathway for light created by one or more walls of material surrounding, enclosing, separating, or otherwise defining a pathway for light to travel through. An optical channel may hold one or more optical elements within it to manipulate the light as it passes through the optical channel. Alternatively an optical channel may also be defined by a set of optical elements defining a pathway for light to travel through. One of ordinary skill in the art will recognize that the optical channel need not be cuboid or rectangular in shape; it can also be cylindrical, oblong, oval, or any geometric shape. Rectangular optical channels are shown only for illustration purposes. One of ordinary skill in the art would recognize that the optical channel need not run strictly parallel to the plane of the lens tray. The term parallel is used for simplicity and illustration purposes only and is not intended to be limiting. One or more lenses, filters, or other optical elements are placed within the optical channels 1404 to produce the desired focal length. One of ordinary skill in the art would understand how lenses, filters, and other optical elements could be arranged within the optical channel 1404 to achieve a desired focal length.

In each lens tray, there is at least one optical entrance and at least one optical exit. The optical entrance is where light enters the lens tray and the optical exit is where light exits the lens tray. When a lens tray includes only optical window openings, the optical entrance and optical exit are at either end of the optical window opening. When optical channels and reflectors are included, the light does not merely pass straight through the lens tray from face to back, but is redirected through a light path within the lens tray before finally exiting toward an imaging unit. In this case the optical exit is not necessarily located exactly opposite the optical entrance.

According to one embodiment of the present invention, a central lens 1405 is placed in front of the central reflector 1409. The central lens 1405 is used in common with each of the optical channels 1404 and allows the limited dimensions of the lens tray 1401 to be used more effectively to achieve long focal lengths. The central lens 1405 is optional and one of ordinary skill in the art would be able to determine the optimum focal length of the central lens 1405 that is necessary to achieve the desired focal lengths when combined with the optical channels 1404.

In lens tray in FIG. 14 is a circular lens tray 1401 with a hole in the center. A central reflector 1409 is positioned in the hole in a fixed position and the lens tray rotates around the central reflector 1409 to line up one of the optical channels between the central reflector 1409 and the imaging unit 1407. Each optical channel 1404 has an optical entrance at the inside edge created by the hole in the center of the lens tray 1401. The central reflector 1409 redirects incoming light into the optical entrance of one of the optical channels 1404. An outgoing reflector 1408 is placed at the other end of each optical channel 1404 to redirect the light into the imaging unit 1407.

The imaging device incorporating the lens tray 1401 of FIG. 14 requires an entry point for light, such as a camera window, aligned with the imaging unit 1407 near the perimeter of the lens tray 1401 and an additional entry point for light at the center of the lens tray. According to one embodiment of the invention, the imaging device incorporating the lens tray 1401 of FIG. 14 would have two camera windows. One camera window would be aligned with the standard optical window openings 1402 and used for short focal lengths and the other camera window would be aligned with the central reflector 1409 of the lens tray 1401 and used for long focal lengths. The same imaging unit 1407 is used for both standard optical window openings 1402 and optical channels 1404 because the outgoing reflectors are aligned with the imaging unit 1407.

Figure 15:
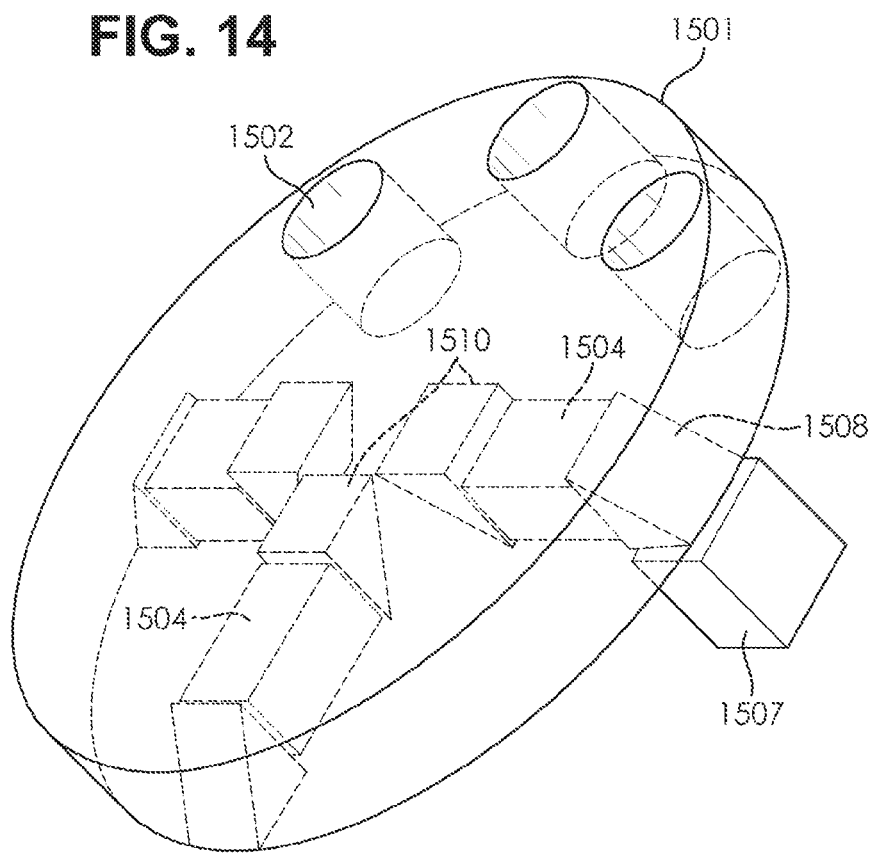
FIG. 15 shows an alternate lens tray for accommodating lens combinations producing long focal lengths according to an embodiment of the present invention.

FIG. 15 shows an alternate embodiment of the lens tray 1501 designed to accommodate lens combinations with long focal lengths. The lens tray of FIG. 15 differs from the lens tray of FIG. 14 in that it does not have a central reflector, but instead has an incoming reflector 1510 for each optical channel 1504. According to one embodiment the invention, the device incorporating the lens tray 1501 of FIG. 15 has two camera windows. One camera window lines up with the outgoing perimeter of the lens tray, and is used for the standard optical window openings 1502. The second camera window aligns with the incoming reflectors 1510, and is used for each of the optical channels 1504. When using one of the longer focal length lens combinations of the various optical channels 1504, light enters the incoming reflector 1510 and is redirected along the optical channel 1504 and refracted by whatever lenses or optical devices may be in that optical channel 1504. The outgoing reflector 1508 redirects the light again to the imaging unit 1507 placed under the lens tray 1501. For the lens trays in FIG. 14 and FIG. 15, light may enter at either of two different entry points or camera windows, but light always exits into the single imaging unit 1407, 1507.

Figure 16:
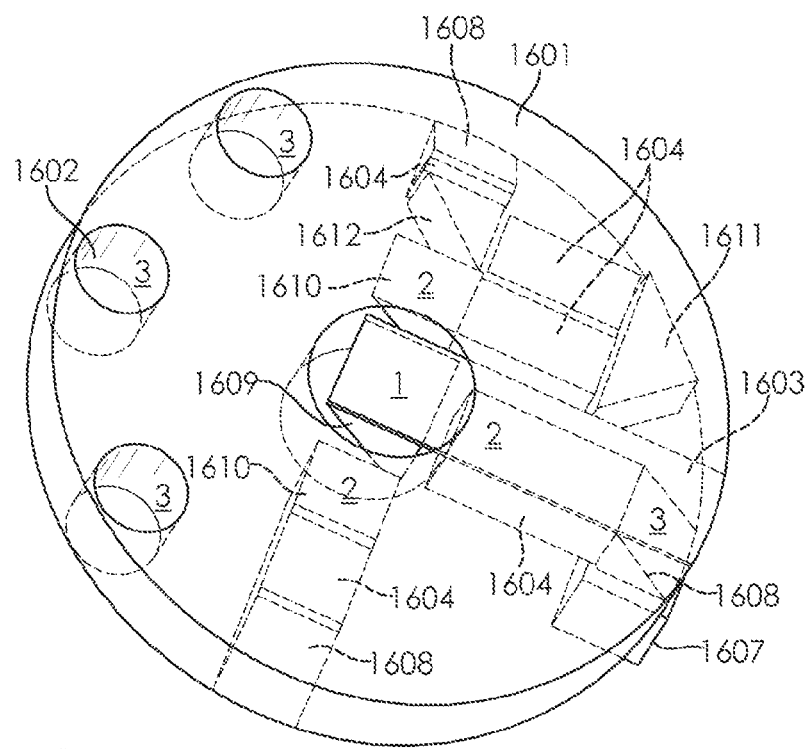
FIG. 16 shows an alternate lens tray with an elongated camera window for accommodating multiple light entry points required for certain lens combinations producing long focal lengths according to an embodiment of the present invention.

FIG. 16 shows an alternate lens tray with an elongated camera window 1603 for accommodating multiple light entry points producing a variety of different long focal lengths. There are three entry points on the elongated camera window 1603. The first entry point marked 1 is in the center of the lens tray. Light enters at point 1 and is reflected through a central reflector 1609 and redirected through an optical channel 1604. At the end of the optical channel 1604, an outgoing reflector 1608 redirects the light toward the imaging unit 1607. Once the light passes through the outgoing reflector 1608, it is in the same location and orientation as if it had passed through an ordinary optical window opening 1602.

The second light entry point is marked 2. There are two reflector and optical channel arrangements that align with entry point 2, and they are marked with a 2 accordingly. One of these is identical to the reflector and optical channel arrangements shown in FIG. 15. The other reflector and optical channel arrangement has two optical channels 1604 and a double reflector 1611 joining the two optical channels 1604. When this combination is aligned with the imaging unit 1607, light enters the camera window 1603 at point 2 and is redirected through an incoming reflector 1610 along the first optical channel 1604. The double reflector causes the light to be redirected 180 degrees back into a second optical channel 1604. At the end of the second optical channel 1604, an intermediate reflector 1612 redirects the light again toward the outer perimeter of the lens tray 1601. At this point the light passes through a final optical channel 1604 before being redirected by the outgoing reflector 1608 toward the imaging unit 1608.

In an alternate embodiment, the second optical channel 1604 extends to the edge of the lens tray where an outgoing reflector 1608 redirects light toward the imaging unit 1607. Depending on the arrangement the light may or may not pass through an intermediate reflector 1612 and/or a third optical channel 1604 before reaching the outgoing reflector 1608 which redirects the light toward the imaging unit 1607. One of ordinary skill in the would recognize that any arrangement of one or more reflectors and one or more optical channels can be used to achieve the desired focal length and the desired optical exit location without departing from the spirit and scope of the present invention.

The third entry point is marked 3. Each of the ordinary optical window openings 1602 lines up with entry point 3, and light passes directly through the optical window openings 1602 to be captured by the imaging unit 1607. In an alternate embodiment, a separate camera window is placed at each of positions 1, 2, and 3. One of ordinary skill in the art would recognize that the arrangement of reflectors and optical channels could utilize more or fewer entry points at various positions that line up with optical entrances anywhere on the lens tray 1601 without departing from the spirit and scope of the present invention.

Figure 17:
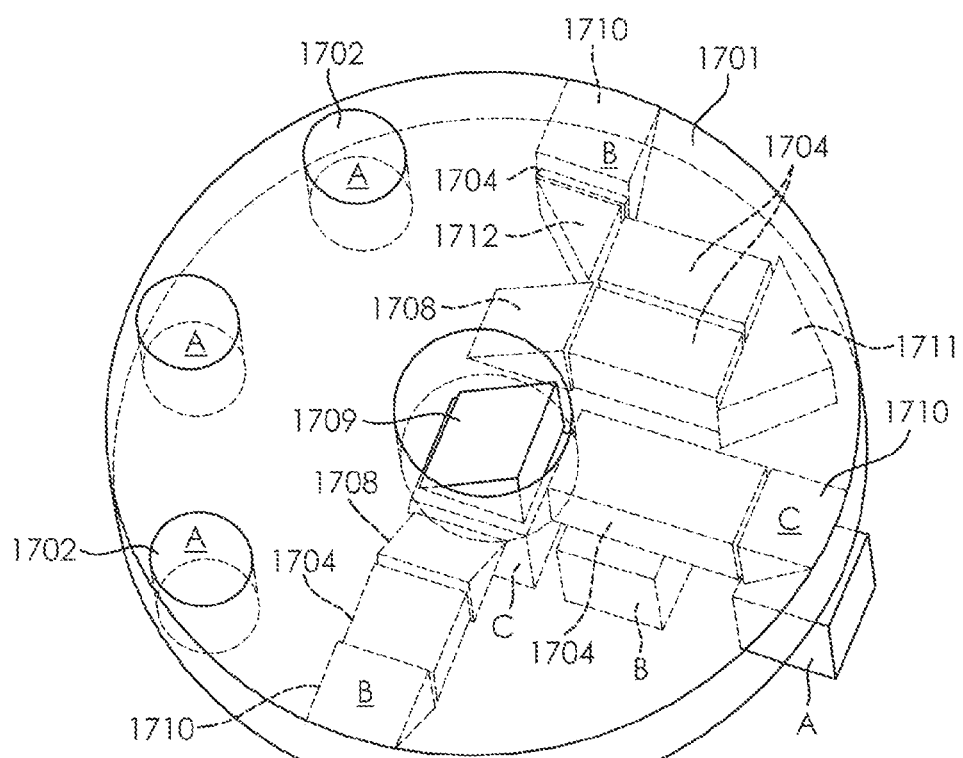
FIG. 17 shows an alternate lens tray with multiple imaging units for accommodating lens combinations producing long focal lengths according to an embodiment of the present invention.

FIG. 17 shows an alternate embodiment of a lens tray 1701 that uses only a single entry point or camera window, but includes three imaging units in order to accommodate various long focal lengths with the lens tray 1701. According the an embodiment of the present invention shown in FIG. 17, there are three imaging units marked A, B, and C. Imaging unit A aligns with the optical window openings 1702 of the lens tray just as in the previously described lens trays.

Imaging unit B aligns with two of the reflector and optical channel arrangements where the incoming reflectors 1710 are marked with B. The first arrangement is identical to the reflector and optical channel arrangements described in FIG. 15, except the orientation is reversed. The light enters at the incoming reflector 1710 positioned at the outer perimeter of the lens tray just as it does for the optical window openings. The incoming reflector 1710 then redirects the light into the optical channel 1704 and the outgoing reflector 1708 redirects the light into imaging unit B.

The second arrangement is similar to the second arrangement shown in FIG. 16, but again, the direction is reversed. Light enters at the incoming reflector 1710 and depending on the arrangement may pass through a short optical channel 1704 before entering an intermediate reflector 1712. The intermediate reflector redirects the light through a first optical channel 1704. A double reflector 1711 redirects the light 180 degrees and into a second optical channel 1704. Finally, an outgoing reflector 1708 redirects the light again toward the imaging unit B.

The third reflector and optical channel arrangement is similar to the arrangement in FIG. 16, but the orientation is reversed. Light enters at the incoming reflector 1710 positioned at the outer perimeter of the lens tray 1701. The incoming reflector 1710 redirects the light through the optical channel 1704. Finally, the center reflector 1709 redirects the light toward the imaging unit C. Alternatively, imaging unit C could be moved to take the place of the center reflector 1709 such that the light exiting through the optical exit at the end of the optical channel 1704 enters directly into imaging unit C. One of ordinary skill in the art would recognize that the arrangement of reflectors and optical channels could utilize more or fewer imaging units at various positions without departing from the spirit and scope of the present invention.

According to an alternative embodiment of the present invention, an imaging unit may be arranged to receive an image directly from the optical channel without being redirected by a reflector such as a prism, mirror or mirror system immediately before. For example, in FIGS. 14-16, an imaging unit may be placed at the outer perimeter of the lens tray in line with the lens tray so that the optical exit is on the outer edge of the lens tray. In FIG. 17, an imaging unit may be placed in the center of the lens tray and the light would exit the inner edge of the lens tray to reach the imaging unit. Optical channels may pass through the center of the lens tray, or extend from one side to the opposite side and be combined with any number of reflectors to accomplish the purpose of directing the light toward an imaging element. These and other embodiments are described with more detail below with reference to FIGS. 18-21.

Figure 18:
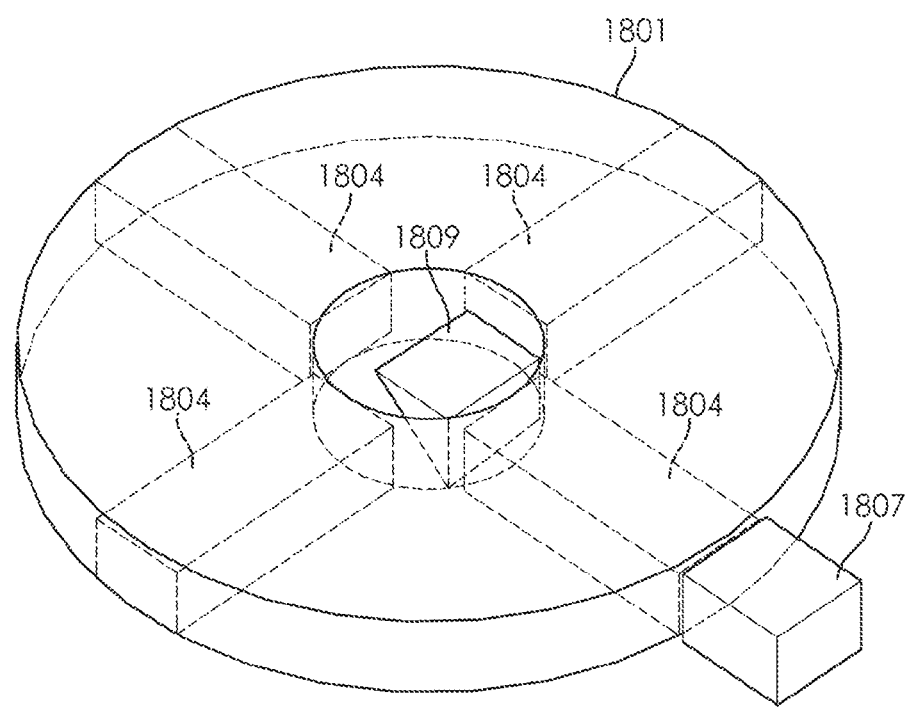
FIG. 18 shows an alternate lens tray with multiple movable optical channels, and with a reflector and an imaging element placed outside the moving lens tray according to an embodiment of the present invention.

FIG. 18 shows a simple example of a lens tray 1801 which contains only optical channels 1804 according to one exemplary embodiment of the present invention. Light enters at an incoming central reflector 1809 and is redirected through one of the optical channels 1804. Which optical channel the light passes through depends on which one is aligned between the central reflector 1809 and the imaging unit 1807. This design may also be reversed, where the incoming reflector is arranged on the outside perimeter of the lens tray 1801 and the imaging unit 1807 is positioned within the hole in the center of the lens tray 1801.

Figure 19:
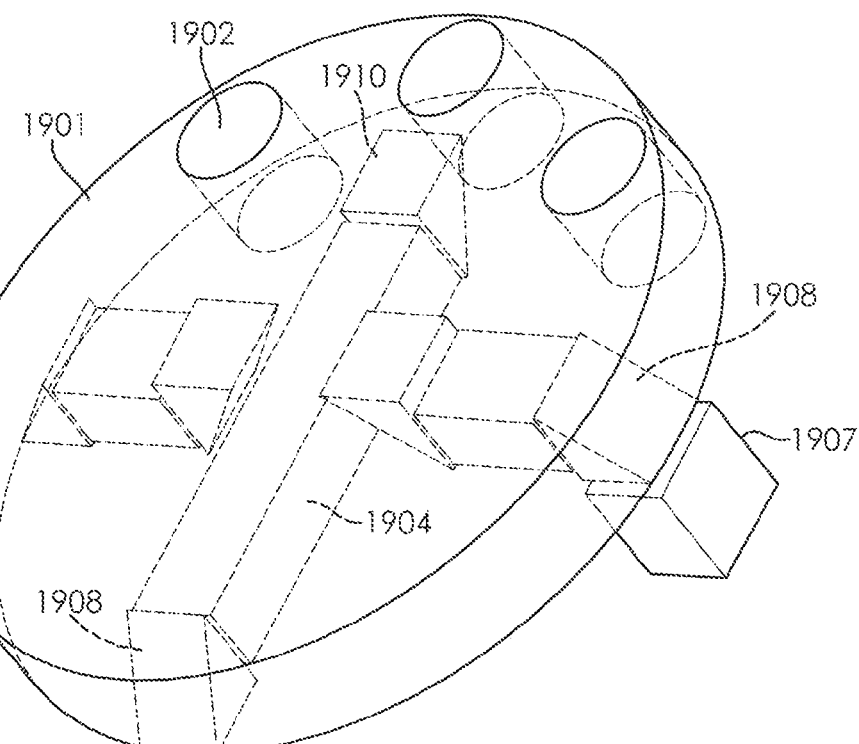
FIG. 19 shows an alternate lens tray with an extended optical channel passing through the geometric center of the lens tray according to an embodiment of the present invention.

FIG. 19 shows a lens tray 1901 where one of the optical channels 1904 passes through the geometric center of the circular lens tray 1901. This allows for an optical channel 1904 to be longer than the radius of the circular lens tray. Light enters the incoming reflector 1910 and is redirected into the optical channel 1904. As light exits the optical channel 1904, it is redirected again toward the imaging unit by an outgoing reflector 1908.

In the case of FIG. 19, there are two options for accommodating the different camera window locations for incoming light with each reflector and optical channel arrangement. The first option is to have an additional or extended camera window positioned at or extended to the location of the incoming reflector when the longest optical channel 1904 is lined up with the imaging unit 1907. If the longest optical channel 1904 extends to the opposite end of the lens tray 1901, a second option is available and the camera window for the standard optical window openings 1902 can be shared. In this case, an addition imaging unit 1907 located at the opposite side of the lens tray 1901 is required. Then the lens tray 1901 can line up with the same camera window used by the other optical window openings 1902.

Figure 20:
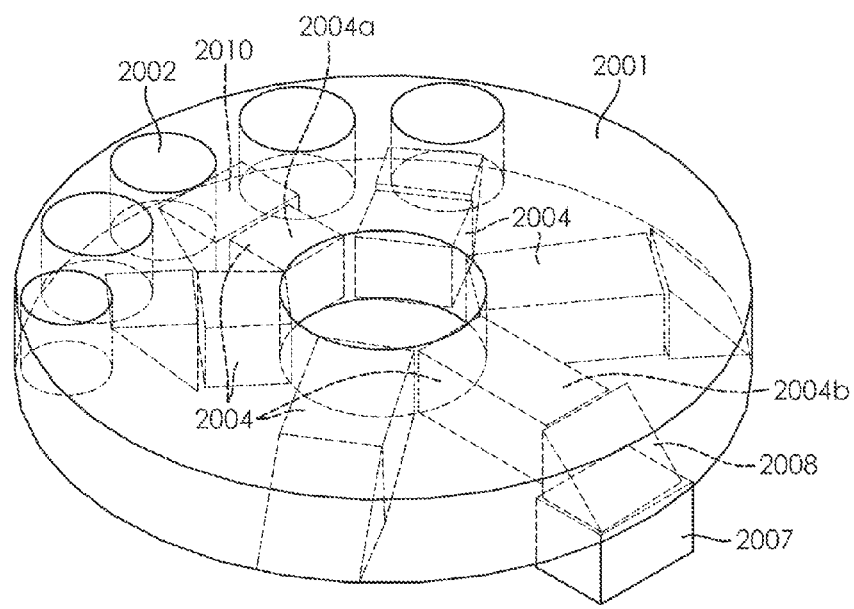
FIG. 20 shows an alternate lens tray with multiple pairs of optical channels arranged around an empty hole in the geometric center of the lens tray according to an embodiment of the present invention.

FIG. 20 shows an alternate embodiment of the present invention where several optical channels 2004 are arranged around a hole in the center of a circular lens tray 2001. Each optical channel 2004 is paired with another optical channel directly across the central hole. Light enters the incoming reflector 2010 and is redirected through the first optical channel 2004a. As the light exits the first optical channel 2004a, it enters the central hole and crosses to the other side to enter the second optical channel 2004b. At the end of the second optical channel 2004b, the outgoing reflector 2008 redirects the light into the imaging unit 2007. The tray rotates to line up the desired set of reflectors 2008, 2010 and optical channels 2004 with the imaging unit 2007. When an optical window opening 2002 is used, light passes directly through the optical window opening 2002 to the imaging unit 2007.

Figure 21:
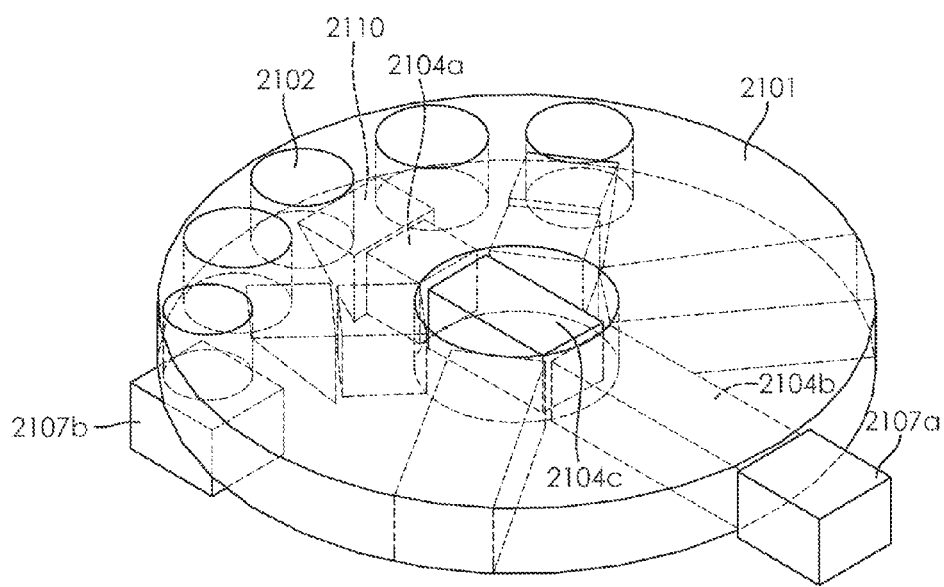
FIG. 21 shows an alternate lens tray with multiple pairs of optical channels arranged around a central optical channel fixed in the geometric center of the lens tray according to an embodiment of the present invention.

FIG. 21 shows an alternate embodiment of the present invention where several optical channels are arranged around a central optical channel 2104c placed in the center of a circular lens tray 2101. The central optical channel 2104c is fixed in position and the circular lens tray 2101 rotates around it to line up one of the pairs of optical channels with the central optical channel 2104c. When optical channels 2104a, 2104b are aligned with the central optical channel 2104c, light enters at the incoming reflector 2110 and is redirected into the first optical channel 2104a. The light then exits the first optical channel 2104a and passes through the central optical channel 2104c before entering the second optical channel 2104b. In this embodiment of the invention, the optical channels do not end with an outgoing reflector, but instead exit straight into a first imaging unit 2107a positioned at the outer perimeter of the lens tray.

According to one embodiment of the present invention, the central optical channel 2104c contains a lens or lens stack that is common to all the optical channel combinations. This allows the same physical lens or lens stack to be shared among all optical channel pairs, reducing size, weight, and material cost. Alternatively, the central optical channel 2104c may have other optical elements or have no optical elements at all.

A second imaging unit 2107b is placed under the lens tray. This imaging unit 2107b is used in combination with the optical window openings 2102. In an alternate embodiment, the incoming reflector 2110 is placed at the edge of the lens tray 2101 where the optical window opening 2102 would normally be. This allows the pathway of light to extend across the entire diameter of the circular lens tray 2101, allowing for long focal length lens combinations. With this type of arrangement, optical window openings 2102, incoming reflectors 2110, and optical channels can be alternated around the perimeter of the lens tray 2101 and only a single camera window is required as long as the imaging units 2107a, 2107b are positioned appropriately at opposite ends of the lens tray.

According to one embodiment of the present invention, two or more lens trays as described above are combined together so that light passes through the first and second lens tray before entering the imaging unit. The first and second lens trays can be combined to achieve longer focal lengths by using two lens trays with optical channels embedded in them and an intermediate reflector to couple the optical exit of the first lens tray to the optical entrance of the second lens tray.

Alternatively the outgoing reflector of the first lens tray can be aligned with the incoming reflector of the second lens tray. One advantage of combining lens trays containing optical channels in this way is that a single light entry point and a single imaging unit can be used for both long and short focal lengths. For example, the first optical lens tray redirects the incoming light away from the camera window and away from the imaging unit which is aligned with the camera window. As the light exits the first lens tray, it then enters the second lens tray with redirects light back toward the imaging element where the optical exit of the second lens tray lines up with the imagine element. Whether long focal lengths (through optical channels) or short focal lengths (through optical window openings) are used, the same imaging unit aligned with a single camera window can be employed for both situations.

As illustrated in FIG. 2, FIG. 5, and FIG. 7a-7f, multiple lens trays can be combined together to achieve a variety of combined optical effects using optical elements such as filters, lenses, lens stacks, reflectors, optical channels, and empty windows. One of ordinary skill in the art would recognize that any combination of lens tray shapes, layouts, and optical window openings, reflectors, optical channels, and imaging units could be used without departing from the spirit and scope of the present invention. As with the lens trays described above, the optical channels may house one or more lenses, filters or optical elements arranged to produce the desired focal length. One of ordinary skill in the art would recognize that a variety of combinations of the features described herein is possible and any of the features of any of the lens trays described herein may be combined with any of the other features without departing from the spirit and scope of the present invention.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A system for directing light to a first imaging element, the system comprising:

a first circular lens tray having first and second planar surfaces and an outer perimeter coupled between the first and second planar surfaces, the first circular lens tray including a first optical channel extending within the first circular lens tray and substantially in parallel with the first and second planar surfaces;

a central hole extending into the first circular lens tray from the first planar surface to the second planar surface in a first direction substantially perpendicular to the first and second planar surfaces, such that the first optical channel extends in a second direction from the central hole towards the outer perimeter of the first circular lens tray to receive a light from the central hole;

an incoming reflector positioned in the central hole and configured to redirect the light from the central hole to the first optical channel;

an outgoing reflector positioned in the first circular lens tray and configured to redirect the light from the first optical channel to the first imaging element; and a first motor configured to rotate the first circular lens tray around the central hole and the incoming reflector to allow the light to be redirected from the central hole to the first optical channel by the incoming reflector and to be redirected from the first optical channel to the first imaging element by the outgoing reflector.

2. The system of claim 1, wherein the first optical channel comprises an optical entrance, and the incoming reflector is arranged in a fixed position inside the central hole such that the first circular lens tray rotates around the incoming reflector to redirect the light from the central hole to the optical entrance of the first optical channel.

3. The system of claim 2, further comprising two or more points of entry for light.

4. The system of claim 1 wherein the optical exit is placed on the outer perimeter edge of the first circular lens tray.

5. The system of claim 4, wherein the first imaging element is placed outside the outer perimeter edge of the first circular lens tray such that outgoing light exiting the optical exit strikes the first imaging element when the optical exit is aligned in a desired position.

6. The system of claim 1 further comprising:
a second circular lens tray having one or more optical window openings creating holes through a plane of the second circular lens tray, wherein at least one of the one or more optical window openings is configured to hold an optical element within the second circular lens tray, and
a second motor configured to move the second circular lens tray and align one of the one or more optical window openings into a desired position.

7. The system of claim 1 further comprising:
a second circular lens tray including:
a second optical entrance configured to allow the light to enter the second circular lens tray;
a second optical exit configured to allow the light to exit he second circular lens tray; and
a second optical channel arranged within the second circular lens tray between the second optical entrance and the second optical exit,
the second optical channel containing one or more optical elements;
an intermediate reflector arranged to redirect light exiting the first circular lens tray toward the second optical entrance of the second circular lens tray; and a second motor configured to move the second circular lens tray and align the second optical exit into a desired position.

8. The system of claim 1, further comprising additional one or more imaging elements.

9. The system of claim 1, further comprising:
a second optical channel, and
a double reflector configured to redirect the light from the first optical channel by 180 degrees and into the second optical channel.

10. The system of claim 9, further comprising a second reflector configured to receive the light parallel to the plane defined by the first circular lens tray and redirect the light to be perpendicular to the plane defined by the first circular lens tray.

11. The system of claim 1, further comprising:
an optical window opening creating an additional hole through the first circular lens tray and configured to hold an optical element within the first circular lens tray, and
an outgoing reflector embedded in the first circular lens tray at the optical exit such that the first optical channel shares the first imaging element with the optical window opening.

12. The system of claim 1, comprising the first imaging element, wherein the first imaging element is configured to capture photographic images.

13. The system of claim 1, wherein the first optical comprises one or more lenses.

14. The system of claim 1, wherein the first optical channel comprises one or more filters.

15. The system of claim 1, further comprising a central lens placed in front of the incoming reflector such that the light reaches the incoming reflector through the central lens.

16. A system for directing light to an imaging element, the system comprising:
a circular lens tray having a radius and including:
a geometric center;
a planar surface;
an outer perimeter;
a first optical entrance on the planar surface and adjacent a first side of the outer perimeter:
a first optical exit adjacent to a second side opposite to the first side of the outer perimeter:,
a first optical channel extending within the circular lens tray through the geometric center, substantially in parallel with the planar surface, and in a first direction from the first optical entrance to the first optical exit, to receive a first light from the first optical entrance, the first optical channel having a first physical length along the first direction longer than the radius of the circular length tray;
a second optical entrance on the planar surface and adjacent to the geometric center;
a second optical exit adjacent to the outer perimeter; and
a second optical channel extending within the circular lens tray aside from the geometric center, substantially in parallel with the planar surface, and in a second direction from the second optical entrance to the second optical exit, to receive a second light from the second optical entrance, the second optical channel having a second physical length along the second direction different from the first physical length, and wherein each of the first optical channel and the second optical channel includes one or more optical elements; and a motor configured to rotate the circular lens tray to align one of the first optical exit and the second optical exit to the imaging element.

17. The system of claim 16, comprising the imaging element, wherein the imaging element is configured to capture photographic images.

\* \* \* \* \*